US008933869B2

(12) United States Patent
Suguro

(10) Patent No.: US 8,933,869 B2
(45) Date of Patent: Jan. 13, 2015

(54) FERROELECTRIC LIQUID CRYSTAL PANEL DRIVING METHOD AND LIQUID CRYSTAL DISPLAY DEVICE

(75) Inventor: Akira Suguro, Fujimi (JP)

(73) Assignee: Citizen Holdings Co., Ltd., Tokyo (JP)

( * ) Notice: Subject to any disclaimer, the term of this patent is extended or adjusted under 35 U.S.C. 154(b) by 177 days.

(21) Appl. No.: 12/741,598

(22) PCT Filed: Mar. 25, 2009

(86) PCT No.: PCT/JP2009/056762
§ 371 (c)(1),
(2), (4) Date: May 6, 2010

(87) PCT Pub. No.: WO2009/119882
PCT Pub. Date: Oct. 1, 2009

(65) Prior Publication Data
US 2010/0225641 A1    Sep. 9, 2010

(30) Foreign Application Priority Data

Mar. 27, 2008   (JP) .................................. 2008-084631

(51) Int. Cl.
G09G 3/36          (2006.01)
G02F 1/141         (2006.01)
(52) U.S. Cl.
CPC .............. *G09G 3/3629* (2013.01); *G02F 1/141* (2013.01); *G09G 2310/06* (2013.01); *G09G 2310/061* (2013.01)
USPC ..................... 345/97; 345/94; 345/95; 345/96
(58) Field of Classification Search
USPC ...................................................... 345/94–97
See application file for complete search history.

(56) References Cited

U.S. PATENT DOCUMENTS 4,697,887 A * 10/1987 Okada et al. .................... 345/96
5,408,246 A *  4/1995 Inaba et al. ...................... 345/89

(Continued)

FOREIGN PATENT DOCUMENTS

CN    1256761 A    6/2000
CN    1287626 A    3/2001

(Continued)

OTHER PUBLICATIONS

International Search Report of PCT/JP2009/056762, Jul. 14, 2009.

*Primary Examiner* — Ilana Spar

(57) ABSTRACT

The present invention relates to a method for driving a ferroelectric liquid crystal panel. A liquid crystal display device according to the present invention includes a ferroelectric liquid crystal panel having a ferroelectric liquid crystal provided between a pair of substrates, a plurality of scanning electrodes and a plurality of drive electrodes, and a plurality of pixels constituted by intersections between the plurality of scanning electrodes and the plurality of signal electrodes, and a controller for applying driving pulses to the plurality of scanning electrodes and the plurality of signal electrodes. The controller applies to the plurality of pixels first reset pulses, first selection pulses for switching the plurality of pixels, second reset pulses having a voltage or pulse width different from that of the first reset pulses, and second selection pulses having a voltage or pulse width different from that of the first selection pulses and for switching the plurality of pixels. According to the present invention, a clear image can be obtained regardless of threshold unevenness.

7 Claims, 18 Drawing Sheets

(56) References Cited

U.S. PATENT DOCUMENTS

| | | | |
|---|---|---|---|
| 5,835,075 A * | 11/1998 | Nomura et al. | 345/97 |
| 6,710,759 B1 | 3/2004 | Kondoh | |
| 2001/0045933 A1 * | 11/2001 | Sakaigawa et al. | 345/98 |
| 2002/0027544 A1 | 3/2002 | Kondoh | |
| 2006/0066545 A1 | 3/2006 | Kondoh et al. | |
| 2007/0052648 A1 * | 3/2007 | Zhou et al. | 345/94 |

FOREIGN PATENT DOCUMENTS

| | | |
|---|---|---|
| JP | 4-085517 A | 3/1992 |
| JP | 9-054307 A | 2/1997 |
| JP | 2001-091923 A | 4/2001 |
| JP | 2006-23481 A | 1/2006 |
| JP | 2006-126819 A | 5/2006 |

* cited by examiner

FIRST FERROELECTRIC STATE
SECOND FERROELECTRIC STATE

Fig.5
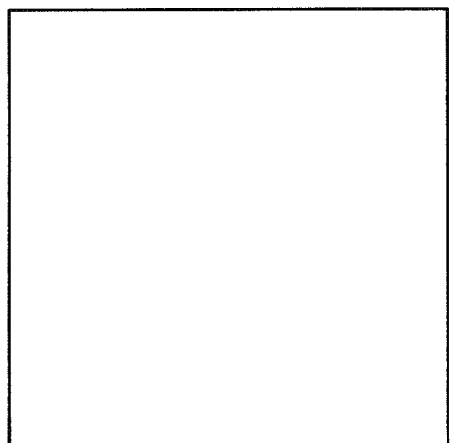 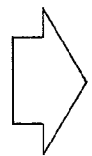 
30  31
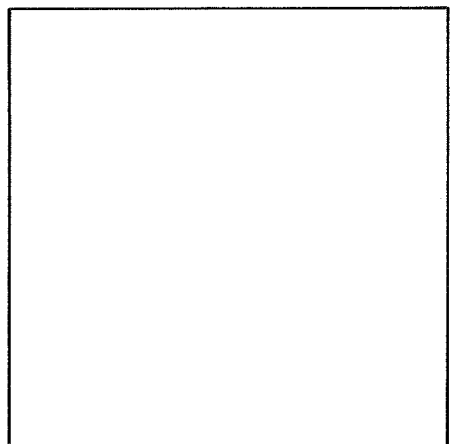  
32  33

Fig.11
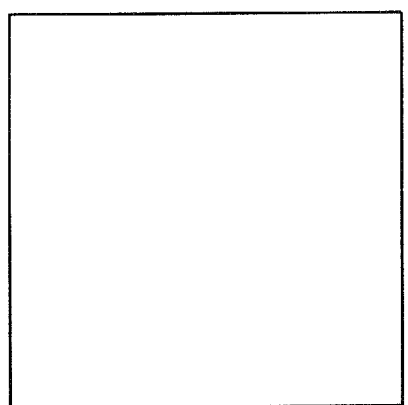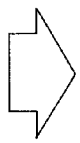
40     41
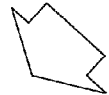
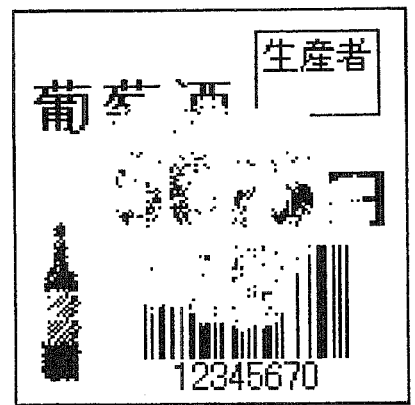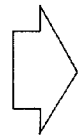
42     43

FERROELECTRIC LIQUID CRYSTAL PANEL DRIVING METHOD AND LIQUID CRYSTAL DISPLAY DEVICE

FIELD OF THE INVENTION

The present invention relates to a method for driving a ferroelectric liquid crystal panel and a liquid crystal display device having the ferroelectric liquid crystal panel.

BACKGROUND OF THE INVENTION

A ferroelectric liquid crystal is capable of exhibiting a plurality of optical states, and can continue to retain a particular state even after removal of applied voltage. When an external force, such as an electric field is applied, ferroelectric liquid crystal molecules lie in one of two stable positions on the lateral surface of a cone (liquid crystal cone). In a liquid crystal display device constructed by sandwiching such a ferroelectric liquid crystal between a pair of substrates, the ferroelectric liquid crystal is controlled so that the liquid crystal molecules lie in one of the two stable positions in accordance with the polarity of the voltage applied across the ferroelectric liquid crystal. One of the two stable states is the first ferroelectric state, and the other is the second ferroelectric state.

FIG. 1 is a diagram illustrating an exemplary configuration of a ferroelectric liquid crystal panel 20 that uses a ferroelectric liquid crystal 10.

In FIG. 1, polarizers 15a (the direction of its polarization axis is designated by "a") and 15b (the direction of its polarization axis is designated by "b") are arranged in a crossed Nichol prism configuration. Ferroelectric liquid crystal 10 is oriented so that the long axis direction of the liquid crystal molecules in ferroelectric liquid crystal 10 in the second ferroelectric state coincides with the polarization axis "a". Accordingly, in the first ferroelectric state, the long axis direction of the liquid crystal molecules coincides with the direction of the other position on the liquid crystal cone as illustrated in FIG. 1.

When polarizers 15a and 15b and ferroelectric liquid crystal 10 are arranged as illustrated in FIG. 1, and ferroelectric liquid crystal 10 is placed in the second ferroelectric state by changing the polarity of the applied voltage (the long axis direction of the liquid crystal molecules in ferroelectric liquid crystal 10 coincides with the polarization axis "a" of polarizer 15a), light is not transmitted through the liquid crystal, and thus ferroelectric liquid crystal panel 20 produces a black display (non-transmission state). On the other hand, when ferroelectric liquid crystal 10 is placed in the first ferroelectric state by changing the polarity of the applied voltage (the long axis direction of the liquid crystal molecules in ferroelectric liquid crystal 10 do not coincide with either the polarization axis "a" of polarizer 15a or with the polarization axis "b" of polarizer 15b), since the long axis direction of the liquid crystal molecules is tilted at a certain angle relative to the polarization axes, light, for example, from a backlight is transmitted through the liquid crystal and liquid crystal panel 20 thus produces a white display (transmission state). A light source other than the backlight may be used to produce the display.

FIG. 2 is a diagram illustrating the relationship between applied voltage and light transmittance for the ferroelectric liquid crystal.

As illustrated in FIG. 2, when the voltage applied to ferroelectric liquid crystal 10 is increased, the voltage value at which light transmittance begins to increase is denoted by V1, and the voltage value at which the transmittance reaches saturation when the voltage is further increased is denoted by V2 (positive threshold). Then, when the voltage applied to ferroelectric liquid crystal 10 is decreased, the voltage value at which the transmittance begins to drop is denoted by V3, and the voltage value at and beyond which the transmittance does not drop further even when the voltage is further decreased is denoted by V4 (negative threshold). The state in which the transmittance is high corresponds to the first ferroelectric state, and the state in which the transmittance is low corresponds to the second ferroelectric state.

For example, when a voltage larger than V2 is applied to ferroelectric liquid crystal 10, ferroelectric liquid crystal 10 is switched to the first ferroelectric state, and thereafter ferroelectric liquid crystal 10 retains the first ferroelectric state even when no voltage is applied. Likewise, when a voltage larger in magnitude than V4 is applied to ferroelectric liquid crystal 10, ferroelectric liquid crystal 10 is switched to the second ferroelectric state, and thereafter ferroelectric liquid crystal 10 retains the second ferroelectric state even when no voltage is applied. In this way, once switched to a given ferroelectric state, ferroelectric liquid crystal 10 retains that state even after removal of the applied voltage. Such a ferroelectric liquid crystal is described, for example, in Patent Document 1.

Further, in the liquid crystal display device using ferroelectric liquid crystal 10, in view of the fact that the thresholds for switching between white and black displays highly depend on the condition of the pixels immediately before the write operation, there is known a liquid crystal driving method that, when the voltages are applied to the pixels, a first voltage V1 is applied and, then, a second voltage V2 (V1<V2) is applied so that the pixels can be switched regardless of the immediately preceding condition of the pixels. (For example, see Patent Document 2.) However, Patent Document 2 does not describe the problem that a clear image cannot be obtained due to threshold unevenness of ferroelectric liquid crystal 10 and provides no solution.

Further, in the liquid crystal display device using ferroelectric liquid crystal 10, it is known that four reset pulses (a neutralization part of a black display level reset pulse, a black level reset pulse, a neutralization part of a white display level reset pulse, and a white level reset pulse) are used to uniformly restore the director of the liquid crystal changed by the previously applied voltage. (For example, see Patent Document 3.) However, Patent Document 3 does not describe the problem that a clear image cannot be obtained due to threshold unevenness of ferroelectric liquid crystal 10 and provides no solution.

Patent Document 1: Japanese Unexamined Patent Publication No. 2006-23481 (FIGS. 1 and 2)
Patent Document 2: Japanese Unexamined Patent Publication No. H4-85517 (FIG. 1)
Patent Document 3: Japanese Unexamined Patent Publication No. H9-54307 (Page 9, FIG. 1)

SUMMARY OF THE INVENTION

FIG. 3 is a diagram illustrating voltages applied to respective pixels when a display device constructed using a ferroelectric liquid crystal is driven by passive matrix driving with a plurality of scanning electrodes and signal electrodes formed in a stripe pattern.

FIG. 3 illustrates the drive pulses applied to the first, second, and n-th scanning electrodes, respectively, and the drive pulses applied to the signal electrodes.

In the display device using the ferroelectric liquid crystal, the screen display once written does not disappear but continues to remain in that state. To rewrite the still image screen, the entire screen must be rewritten by scanning all the scanning electrodes once. Accordingly, the display device using the ferroelectric liquid crystal has a first reset period, a write period during which all the scanning electrodes are scanned and an image display retention period during which no voltage is applied. To produce a desired screen display, it is only necessary to apply a voltage during the write period, and no voltage need be applied during the screen display retention period.

In the reset period Re, scanning pulses of ±VCOM are applied to all scanning electrodes and signal pulses of ±VSEG are applied to the signal electrodes. The drive voltage applied to the pixels is the sum of the scanning pulses applied to the scanning electrodes and the signal pulses applied to the signal electrodes.

In the write period, the scanning pulses of ±VCOM are applied sequentially from the first scanning electrodes and the signal pulses of ±VSEG corresponding to the white or black display are applied to the signal electrodes. In the example in FIG. 3, the signal pulses of ±VSEG corresponding to the black display are applied to the first to the (n−1)-th signal electrodes and the signal pulses of ±VSEG corresponding to the white display are applied only to the n-th signal electrode.

FIG. 4 is a diagram illustrating the drive voltages applied to the first pixel (1, m), the second pixel (2, m) and the n-th pixel (n, m) on the first scanning electrode.

In FIG. 4, the reset period Re, the write period and the display retention period are illustrated, and in the write period, a selection period 1 for applying the selection pulses and the nonselection period 2 for applying the nonselection pulses are illustrated.

As illustrated in FIG. 4, in the latter half of the reset period Re, the reset pulses of a voltage+(VCOM+VSEG) larger than the threshold V2 (see FIG. 2) for switching the ferroelectric liquid crystal 108 to the white display is applied (see the pulses c1, c2 and c3 in FIG. 4) and the screen is reset to the white display.

When producing the black display in the selection period 1, in the latter half of the selection period 1, the selection pulses of a voltage−(VCOM+VSEG) having an absolute value larger than that of the threshold (V4) for switching the ferroelectric liquid crystal to the black display is applied to produce the black display (see the pulses c4 and c5 in FIG. 4). On the other hand, when producing the white display in the selection period 1, in order to retain the white display established in the reset period Re, the selection pulses of ±(VCOM−VSEG) are applied (the pulses c6 and c7 in FIG. 4) and the white display is retained.

In the nonselection period 2, the voltage±(VSEG) is applied to retain the previous state.

FIG. 5 is a diagram illustrating exemplary images displayed on a ferroelectric liquid crystal panel.

Exemplary images 30 and 32 illustrate a state in which the screen is reset to the white display and an exemplary image 31 illustrates a state in which the pixels retain the white display or switch to the black display selectively as desired.

However, when the pulses illustrated in FIGS. 3 and 4 are applied to the scanning and signal electrodes, there is a problem in that the part that should retain the white display turns into the black display and a clear image cannot be displayed as illustrated in an exemplary image 33.

This results from the fact that the thresholds of the ferroelectric liquid crystal are not uniformly constant across the screen or, in other words, there is threshold unevenness in the ferroelectric liquid crystal panel. One of the reasons why the image as illustrated in the exemplary display 33 in FIG. 5 is displayed, is that there are the ferroelectric liquid crystal pixels whose threshold V4 (see FIG. 2) for switching from the white display to the black display is low and such pixels are switched from the white display to the black display in response to the pulse c7 in FIG. 4.

In the case of the exemplary display 33, the reset screen produces the white display (the background is white) and the problem is that the pixels that should produce the white display turn into the black display. However, in the case in which the reset screen produces the black display (the background is black), the problem is that the pixels that should produce the black display turn into the white display.

It is an object of the present invention to provide a method for driving a ferroelectric liquid crystal panel and a liquid crystal display device that can solve the above problem.

It is another object of the present invention to provide a method for driving a ferroelectric liquid crystal panel and a liquid crystal display device by which a clear image can be obtained regardless of threshold unevenness.

A liquid crystal display device according to the present invention includes a ferroelectric liquid crystal panel having a ferroelectric liquid crystal provided between a pair of substrates, a plurality of scanning electrodes and a plurality of drive electrodes for driving the ferroelectric liquid crystal, and a plurality of pixels constituted by intersections between the plurality of scanning electrodes and the plurality of signal electrodes, and a controller for applying driving pulses to the plurality of scanning electrodes and the plurality of signal electrodes, wherein the controller applies to the plurality of pixels first reset pulses, first selection pulses for switching the plurality of pixels, second reset pulses having a voltage or pulse width different from that of the first reset pulses, and second selection pulses having a voltage or pulse width different from that of the first selection pulses and for switching the plurality of pixels.

Preferably, in the liquid crystal display device according to the present invention, the second reset pulses have a voltage smaller than that of the first reset pulses or a pulse width smaller than that of the first reset pulses, and the second selection pulses have a voltage smaller than that of the first selection pulses or a pulse width smaller than that of the first selection pulses.

Preferably, in the liquid crystal display device according to the present invention, the ferroelectric liquid crystal panel has a plurality of scanning electrodes and a plurality of signal electrodes, and the first reset pulses and the second reset pulses are applied to all of the plurality of scanning electrodes.

Preferably, in the liquid crystal display device according to the present invention, the ferroelectric liquid crystal panel has a plurality of scanning electrodes and a plurality of signal electrodes, and the first reset pulses and the second reset pulses are applied sequentially to each of the plurality of scanning electrodes.

Preferably, in the liquid crystal display device according to the present invention, the ferroelectric liquid crystal panel has a plurality of pixels constituted by intersections between a plurality of scanning electrodes and a plurality of signal electrodes, and the first reset pulses, the first selection pulses, the second reset pulses and the second selection pulses are applied sequentially to the plurality of scanning electrodes.

Preferably, the liquid crystal display device according to the present invention further includes a temperature sensor, wherein the controller changes voltages or pulse widths of the first and second reset pulses and the first and second selection pulses based on detection output of the temperature sensor.

A method for driving a ferroelectric liquid crystal panel according to the present invention includes the steps of applying first reset pulses to a ferroelectric liquid crystal through electrodes, applying first selection pulses for switching the ferroelectric liquid crystal to the ferroelectric liquid crystal through the electrodes after the application of the first reset pulses, applying second reset pulses having a voltage or pulse width different from that of the first reset pulses to the ferroelectric liquid crystal through the electrodes after the application of the first selection pulses, and applying second selection pulses having a voltage or pulse width different from that of the first selection pulses and for switching the ferroelectric liquid crystal to the ferroelectric liquid crystal through the electrodes after the application of the second reset pulses.

According to the method for driving the ferroelectric liquid crystal panel and the liquid crystal display device according to the present invention, because the voltage of the second reset pulses is different from that of the first reset pulses and the voltage of the second selection pulses is different from that of the first selection pulses, a good image can be displayed on the ferroelectric liquid crystal panel even if there is threshold unevenness.

Further, according to the method for driving the ferroelectric liquid crystal panel and the liquid crystal display device according to the present invention, by making the voltage of the second reset pulses smaller than that of the first reset pulses by α (or making the pulse width smaller by β) and by making the voltage of the selection pulses for retaining white display in a second write period smaller than that of the first selection pulses by α (or making the pulse width smaller by β), even the pixels whose threshold for switching is low does not turn into the black display and a good image can be displayed on the ferroelectric liquid crystal panel.

Still further, in the method for driving the ferroelectric liquid crystal panel and the liquid crystal display device according to the present invention, when the control is performed based on the detection output, a better image can be displayed on the ferroelectric liquid crystal panel regardless of variation of the thresholds or variation of the threshold unevenness due to environmental temperature change.

BRIEF DESCRIPTION OF THE DRAWINGS

FIG. 5 is a diagram illustrating exemplary images displayed on a ferroelectric liquid crystal panel;

FIG. 11 is a diagram illustrating exemplary images as a result of the drive pulses illustrated in FIG. 10;

DETAILED DESCRIPTION OF THE PREFERRED EMBODIMENTS

A method for driving a ferroelectric liquid crystal panel 108 and a liquid crystal display device according to the present invention will be described below with reference to the drawings. However, it should be noted that the technical scope of the present invention is not limited by the specific embodiments described herein, but embraces the inventions described in the appended claims and their equivalents.

Figure 6:
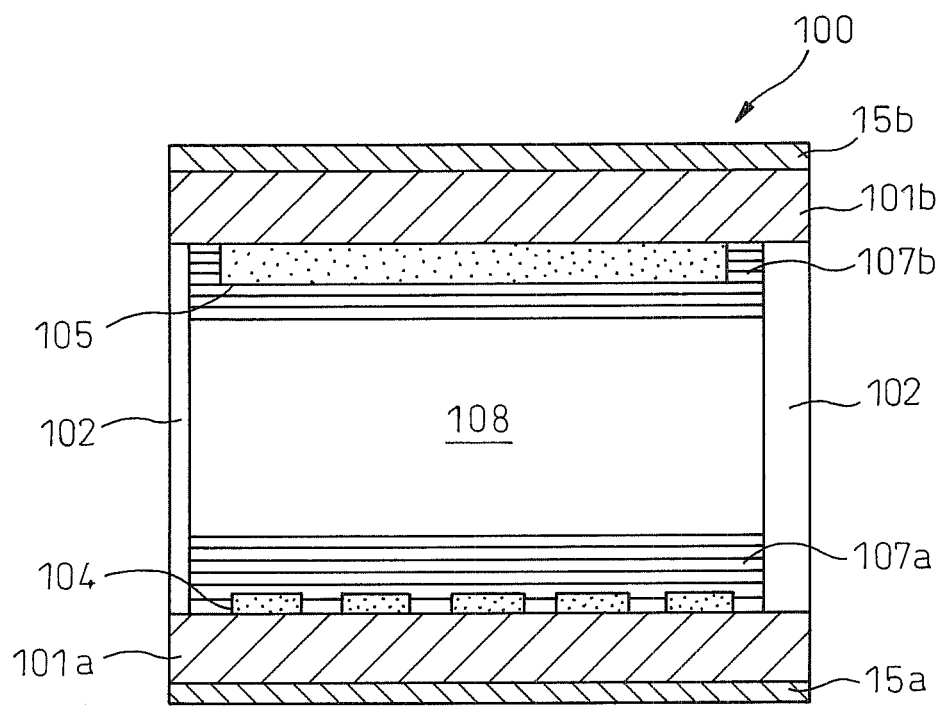
FIG. 6 is a schematic cross-sectional view of a ferroelectric liquid crystal panel used in the present invention.

FIG. 6 is a schematic cross-sectional view of a ferroelectric liquid crystal panel 100 used in the present invention.

A ferroelectric liquid crystal 108 is sandwiched between two transparent glass substrates 101a and 101b and sealed by a sealants 102. A plurality of scanning electrodes 104 are arranged in a stripe pattern on transparent glass substrate 101a. A plurality of signal electrodes 105 are arranged in a stripe pattern on transparent glass substrate 101b.

Figure 1:
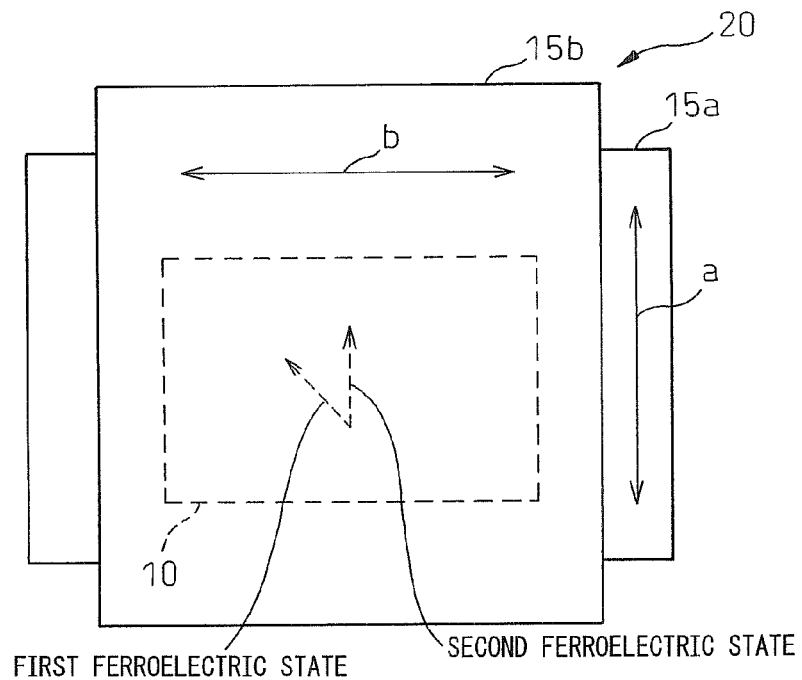
FIG. 1 is a diagram illustrating an exemplary configuration of a ferroelectric liquid crystal panel that uses a ferroelectric liquid crystal.
Figure 2:
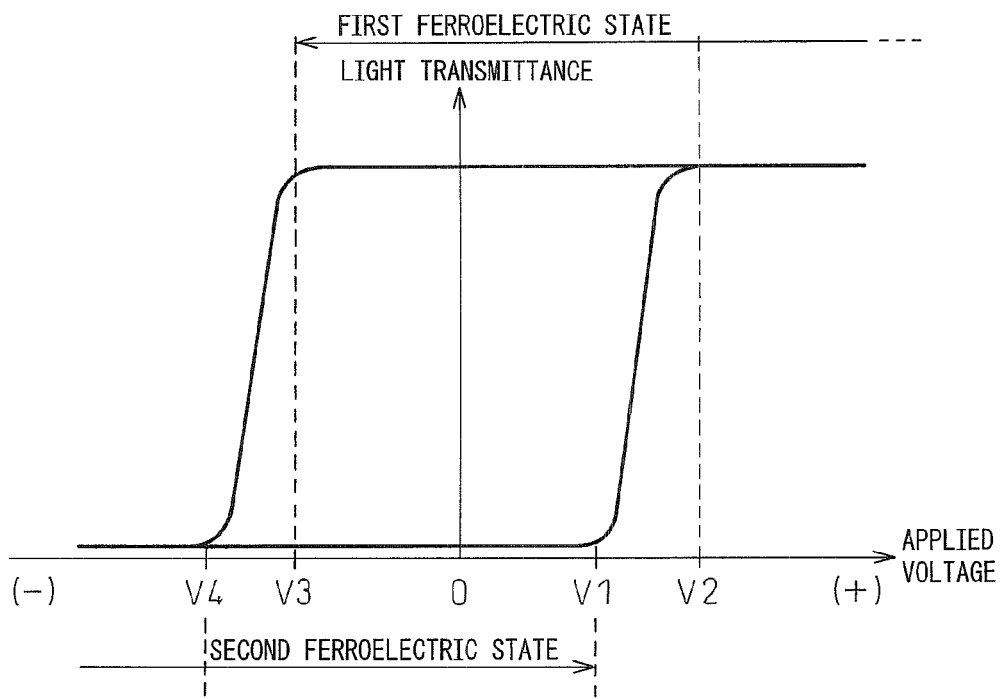
FIG. 2 is a diagram illustrating the relationship between applied voltage and light transmittance for a ferroelectric liquid crystal.
Figure 3:
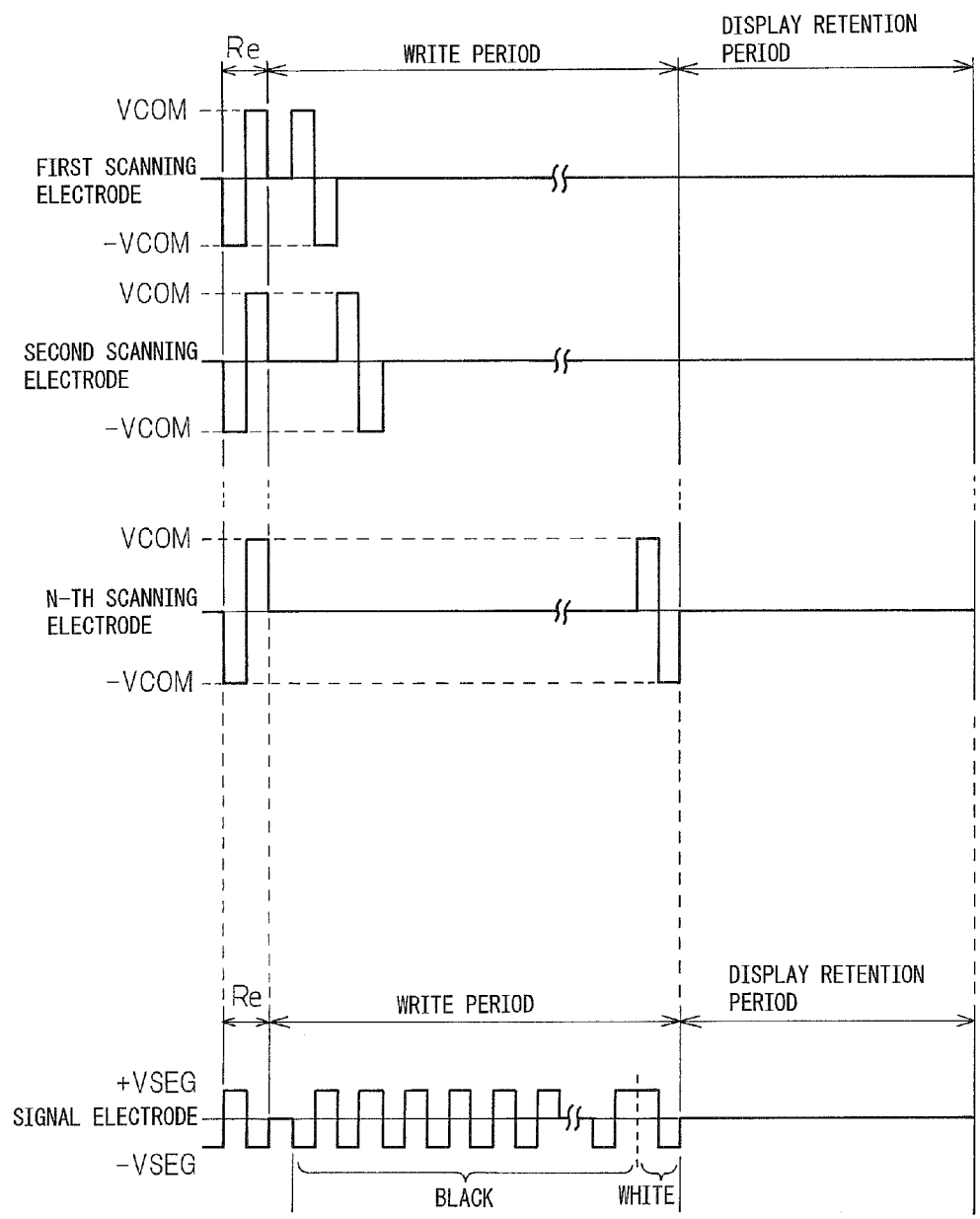
FIG. 3 is a diagram illustrating an example of scanning/signal pulses applied to scanning and signal electrodes.
Figure 4:
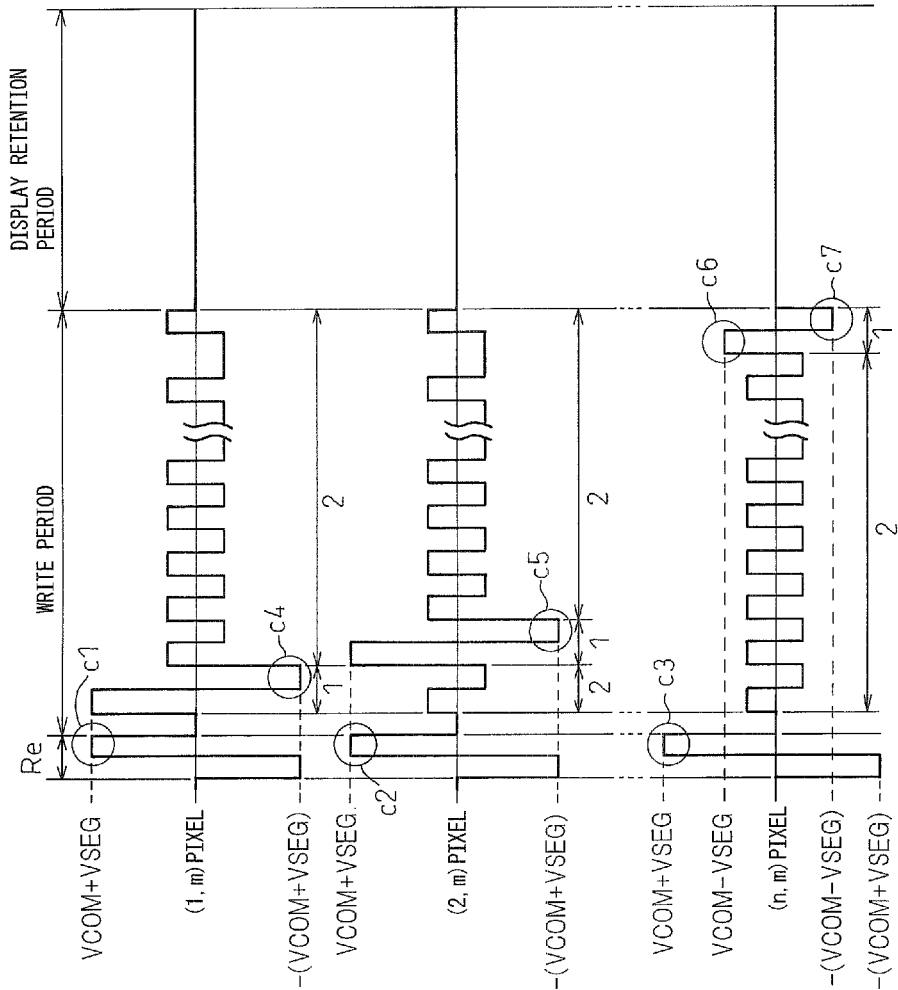
FIG. 4 is a diagram illustrating an example of drive pulses applied to pixels.

Ferroelectric liquid crystal 108 exhibits behavior such as described with reference to FIGS. 1 to 2. Polarizers 15a and 15b illustrated in FIG. 1 are arranged on the outside of respective transparent glass substrates 101a and 101b.

In ferroelectric liquid crystal panel 100, scanning electrodes 104 and signal electrodes 105 made of transparent electrodes are formed on respective glass substrates 101, and SiO alignment films 107a and 107b are formed by oblique evaporation over the respective electrodes. The pair of glass substrates 101 are held opposite each other with a gap of 1 to 2 μm provided therebetween by interposing spacers (not shown), and are bonded together by sealants 102. The empty cell thus fabricated is placed in a vacuum environment, and ferroelectric liquid crystal 108 melted by heating is placed on an injection hole (not shown) and injected into the cell.

Figure 7:
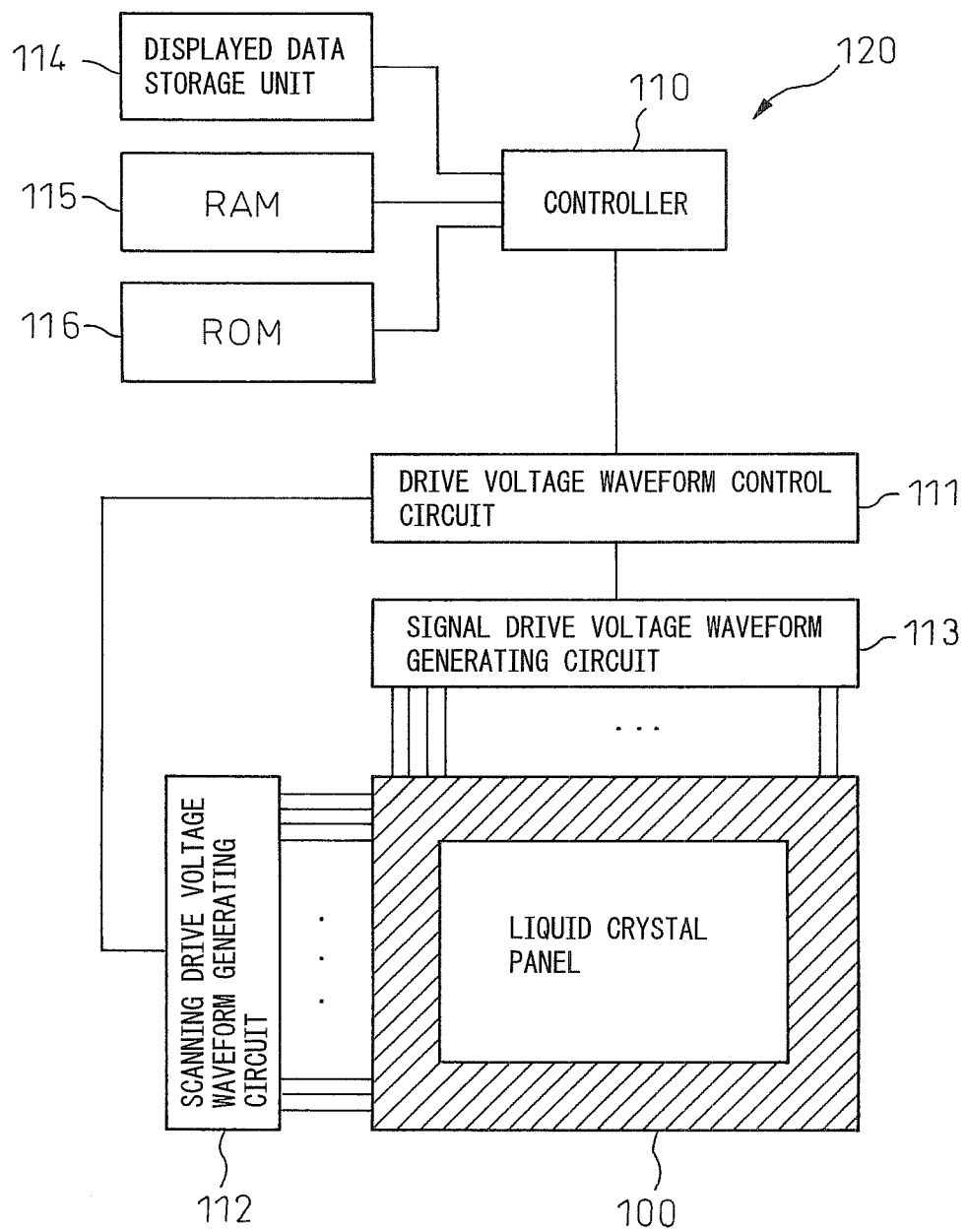
FIG. 7 is a schematic block diagram of a liquid crystal display device according to the present invention.

FIG. 7 is a schematic block diagram of a liquid crystal display device according to the present invention.

A liquid crystal display device 120 comprises, in addition to ferroelectric liquid crystal panel 100, a controller 110, a drive voltage waveform control circuit 111, a scanning drive voltage waveform generating circuit 112 for applying a voltage waveform to each scanning electrode 104, a signal drive voltage waveform generating circuit 113 for applying a voltage waveform to each signal electrode 105, a display data storage unit 114, a RAM 115, and a ROM 116.

In accordance with a program prestored in RAM 115 or ROM 116, controller 110 supplies a control signal to drive voltage waveform control circuit 111 so that display data stored in display data storage unit 114 is displayed on ferroelectric liquid crystal panel 100. In response to the supplied control signal, drive voltage waveform control circuit 111 controls scanning drive voltage waveform generating circuit 112 and signal drive voltage waveform generating circuit 113 so that prescribed voltage waveforms are supplied to the plurality of scanning electrodes 104 and the plurality of signal electrodes 105.

Hereinafter, in liquid crystal display device 120 according to the present invention, drive pulses applied to ferroelectric liquid crystal display device 100 will be described.

Figure 8:
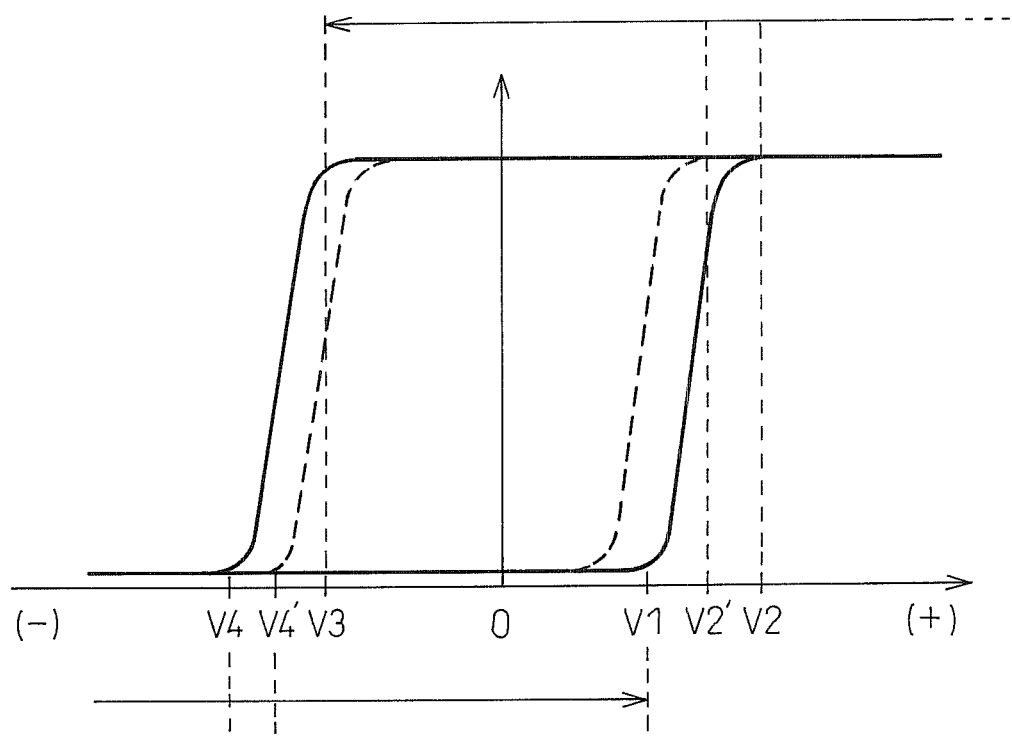
FIG. 8 is a diagram illustrating the relationship between applied voltage and light transmittance for a ferroelectric liquid crystal when there is threshold unevenness.

FIG. 8 is a diagram illustrating the relationship between applied voltage and light transmittance for a ferroelectric liquid crystal when there is threshold unevenness.

In ferroelectric liquid crystal display device 100, depending on threshold unevenness, pixels having high thresholds V2 and V4 where ferroelectric liquid crystal 108 is switched and pixels having low thresholds V2' and V4' coexist. The relationship between the high switching thresholds V2 and V4 and the low switching thresholds V2' and V4' is illustrated in FIG. 8. The following description will be made on the assumption that there is threshold unevenness in ferroelectric liquid crystal display device 100.

Figure 9:
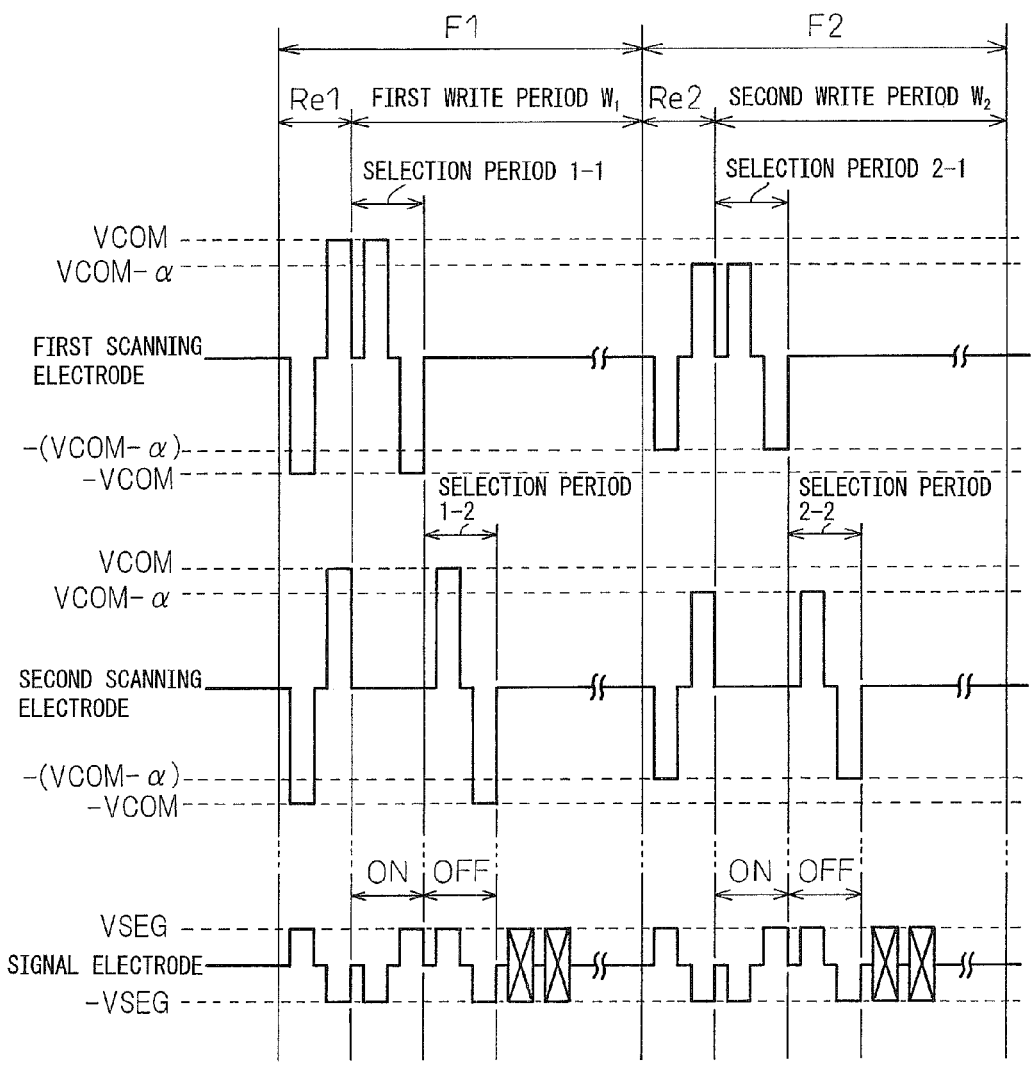
FIG. 9 is a diagram illustrating an example of scanning/signal pulses applied to scanning and signal electrodes.

FIG. 9 is a diagram illustrating an example of scanning/signal pulses applied to scanning and signal electrodes of a ferroelectric liquid crystal panel.

FIG. 9 illustrates scanning pulses applied to first and second scanning electrodes 104 and signal pulses applied to all signal electrodes 105. Drive voltage waveform control circuit 111 controls scanning drive voltage waveform generating circuit 112 to apply the scanning pulses for the scanning electrodes illustrated in FIG. 9 to scanning electrodes 104 and controls signal drive voltage waveform generating circuit 113 to apply the signal pulses for the signal electrodes illustrated in FIG. 9 to signal electrodes 105.

The scanning/signal pulses illustrated in FIG. 9 write an image to ferroelectric liquid crystal panel 100 employing a first frame F1 and a second frame F2. The first frame F1 includes a first reset period Re1 and a first write period W1, and the second frame F2 includes a second reset period Re2 and a second write period W2.

In the first reset period Re1, the scanning pulses of ±VCOM are applied to all scanning electrodes and the signal pulses of ±VSEG are applied to the signal electrodes. The drive voltage applied to each pixel is the sum of the scanning and signal pulses applied to the corresponding scanning and signal electrodes.

In the first write period W1, the scanning pulses of ±VCOM are applied sequentially to all scanning electrodes in the order of the first scanning electrode in a selection period 1-1, the second scanning electrode in a selection period 1-2, and so on. Further, in the first write period W1, the signal pulses of ±VSEG corresponding to white or black display are applied to all signal electrodes. In an example of the drive pulses to the signal electrodes illustrated in FIG. 9, an ON pulse corresponding to the black display is applied during the selection period 1-1 corresponding to the first scanning electrode, and an OFF pulse corresponding to the white display is applied during the selection period 1-2 corresponding to the second scanning electrode.

In the second reset period Re2, the scanning pulses of ±(VCOM−α) are applied to all scanning electrodes, and the signal pulses of ±VSEG are applied to the signal electrodes.

In the second write period W2, the scanning pulses of ±(VCOM−α) are applied sequentially to all scanning electrodes in the order of the first scanning electrode in a selection period 2-1, the second scanning electrode in a selection period 2-2, and so on. Further, in the second write period W2, the signal pulses of ±VSEG corresponding to the white or black display are applied to all signal electrodes. In an example of the drive pulses to the signal electrodes illustrated in FIG. 9, an ON pulse corresponding to the black display is applied during selection period 2-1 corresponding to the first scanning electrode, and an OFF pulse corresponding to the white display is applied during the selection period 2-2 corresponding to the second scanning electrode.

Figure 10:
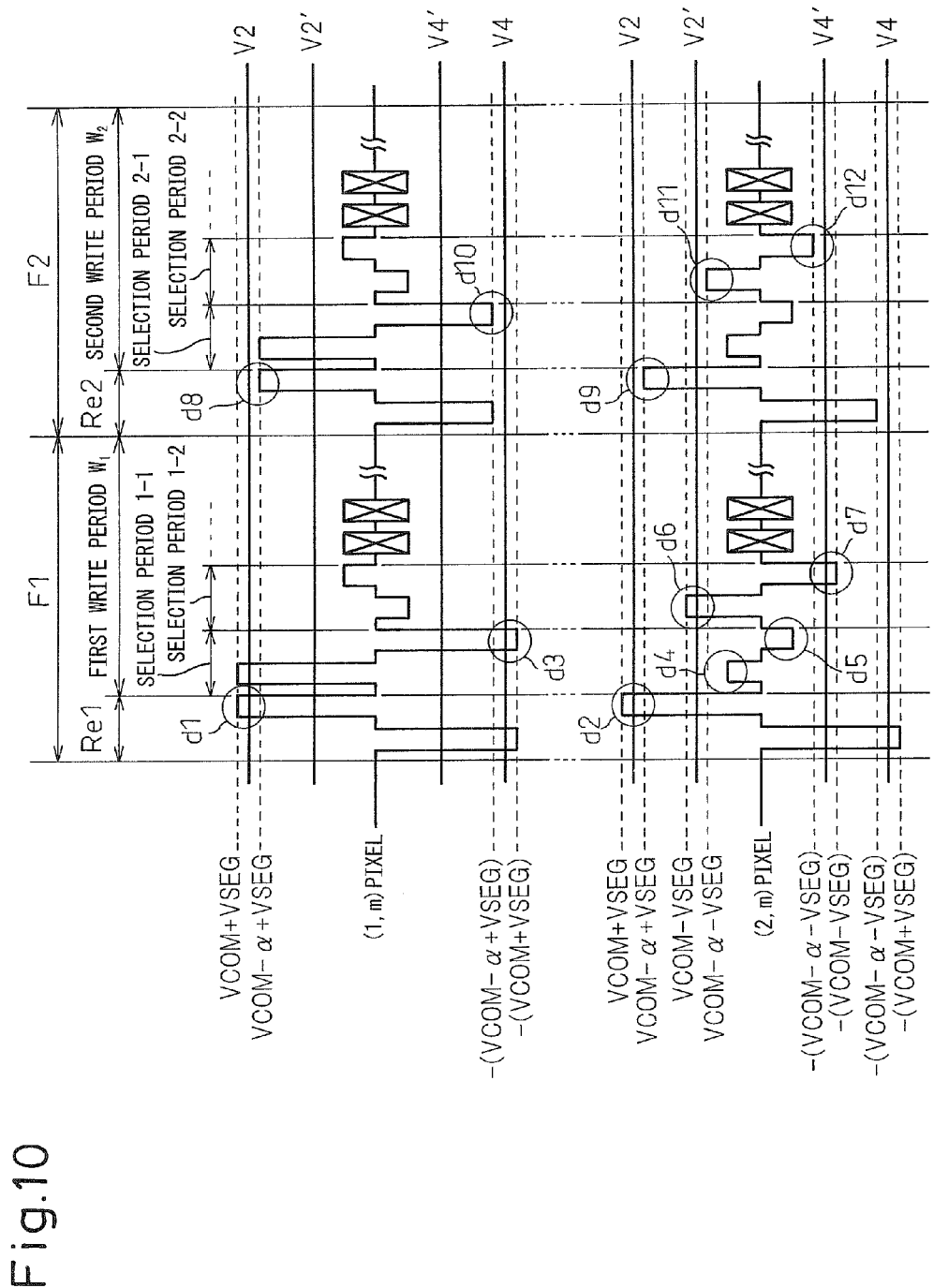
FIG. 10 is a diagram illustrating drive pulses when the scanning and signal pulses illustrated in FIG. 9 are applied.

FIG. 10 is a diagram illustrating drive pulses when the scanning pulses and signal pulses illustrated in FIG. 9 are applied.

FIG. 10 illustrates drive pulses applied to a first pixel (1, m) and a second pixel (2, m) on the first scanning electrode. All periods illustrated in FIG. 10 are the same as those illustrated in FIG. 9.

FIG. 11 is a diagram illustrating exemplary images as a result of the drive pulses illustrated in FIG. 10.

In the latter half of the first reset period Re1, reset pulses of a voltage+(VCOM+VSEG) greater than the threshold (V2) for switching ferroelectric liquid crystal 108 to the white display are applied (see pulses d1 and d2 in FIG. 10) so that the entire screen is reset to the white display. An example of this state is illustrated in an exemplary image 40 in FIG. 11.

In the latter half of the selection period 1-1, a selection pulse of a voltage−(VCOM+VSEG) having an absolute value larger than that of the threshold (V4) for switching ferroelectric liquid crystal 108 to the black display is applied to the pixel (1, m) so that the pixel (1, m) turns into the black display (see a pulse d3 in FIG. 10). On the other hand, in the selection period 1-1, pulses of ±(VSEG) are applied to nonselected pixels (for example, a pixel (2, m)) to retain the previous state (see pulses d4 and d5 in FIG. 10).

In the selection period 1-2, selection pulses of ±(VCOM−VSEG) are applied to the pixel (2, m) to retain the white display established in the first reset period Re1 (see pulses d6 and d7 in FIG. 10).

However, because of the threshold unevenness, in response to the pulse d7 in FIG. 10, the pixels having the smaller threshold (V4') may be switched from the white display to the black display. An example of the state in which the pixels having the smaller threshold (V4') are switched to the black display is illustrated in an exemplary image 41 in FIG. 11.

In the second reset period Re2, reset pulses of a voltage± (VCOM−α+VSEG) smaller than the voltage±(VCOM+ VSEG) applied in the first reset period Re1 are applied (see pulses d8 and d9 in FIG. 10). This voltage is smaller than the threshold (V2) for switching ferroelectric liquid crystal 108 to the white display, and therefore all of the pixels cannot be switched to the white display but only the pixels having a lower threshold (V2') are switched to the white display. An example of this state is illustrated in an exemplary image 42 in FIG. 11.

In the selection period 2-1, eventually, a selection pulse of a voltage±(VCOM−α+VSEG) smaller than ±(VCOM+ VSEG) applied in the selection period 1-1 is applied (see a pulse d10 in FIG. 10).

In the selection period 2-2, selection pulses of a voltage± (VCOM−α−VSEG) are applied to the pixel (2, m) to retain the white display established in the second reset period Re2 (see pulses d11 and d12 in FIG. 10).

In the first write period W1, the selection pulses of the voltage±(VCOM−VSEG) are applied to retain the white display established in the first reset period Re1. But, the pixels having the smaller threshold (V4') are switched to the black display in response to the selection pulse (see the pulse d7 in FIG. 10). However, in the second write period W2, the voltage of the selection pulse±(VCOM−α−VSEG) is further smaller than the threshold (V4') (see the pulse d12 in FIG. 10). Therefore, even the pixels having the smaller threshold (V4') are not switched to the black display in response to the selection pulse (see the pulse d12 in FIG. 10). An example of this state is illustrated in an exemplary image 43 in FIG. 11.

If the pixel (1, m) has the larger threshold (V2) for switching the state of ferroelectric liquid crystal 108, it is reset to the white display in response to the reset pulse in the first reset period Re1 (see the pulse d1 in FIG. 10) and switched to the black display in response to the selection pulse in the selection period 1-1 (see the pulse d3 in FIG. 10) but it is not reset to the white display in response to the reset pulse in the second reset period Re 2 (see the pulse d8 in FIG. 10). Therefore, the selection pulse in the selection period 2-1 (see the pulse d10 in FIG. 10) does not have sufficiently high voltage to switch the polarity in itself and the pixel (1, m) retains the black display established in selection period 1-1 as it is. On the other hand, if the pixel (1, m) has the smaller threshold (V2) for switching the state of ferroelectric liquid crystal 108, it is reset to the white display in response to the reset pulse in the first reset period Re1 (see the pulse d1 in FIG. 10) and switched to the black display in response to the selection pulse in the selection period 1-1 (see the pulse d3 in FIG. 10) and reset to the white display again in response to the selection pulse in the second reset period Re2 (see the pulse d8 in FIG. 10). However, it is switched to the black display again in response to the selection pulse in the selection period 2-1 (see the pulse d10 in FIG. 10). Therefore, regardless of whether the pixel to be switched to the black display has the larger threshold (V2) or the smaller threshold (V2'), the pixel can be switched to the black display by using the scanning/signal pulses to the scanning and signal electrodes illustrated in FIG. 9.

If the pixel (2, m) has the larger thresholds (V2 and V4) for switching the state of ferroelectric liquid crystal 108, it is reset to the white display in response to the reset pulse in the first reset period Re1 (see the pulse d2 in FIG. 10) and retains this state in response to the nonselection pulses in the selection period 1-1 (see the pulses d4 and d5 in FIG. 10) and it retains this state again in response to the nonselection pulses in the selection period 1-2 (see pulses d6 and d7 in FIG. 10). Further, it retains the white display in response to the reset pulse in the second reset period Re2 (see the pulse d9 in FIG. 10) and it also retains the white display in response to the nonselection pulse in the selection period 2-1 and the selection pulse in the selection period 2-2 (see the pulses d11 and d12 in FIG. 10). On the other hand, if the pixel (2, m) has the smaller thresholds (V2' and V4') for switching the state of ferroelectric liquid crystal 108, it is reset to the white display in response to the reset pulse in the first reset period Re1 (see the pulse d2 in FIG. 10) but it may be switched to the black display in response to the selection pulse in the selection period 1-2 (see the pulse d7 in FIG. 10). Even in this case, it is reset to the white display again in response to the reset pulse in the reset period Re2 (see the pulse d9 in FIG. 10). However, because the selection pulse in the selection period 2-2 (see the pulse d12 in FIG. 10) has the smaller absolute value of the voltage than the selection pulse in the selection period 1-1 (see the pulse d7 in FIG. 10), the pixel (2, m) is not switched to the black display. Therefore, regardless of whether the pixel to be reset to the white display has the larger thresholds (V2 and V4) or the smaller thresholds (V2' and V4'), the pixel can retain the white display by using the scanning/signal pulses to the scanning and signal electrodes illustrated in FIG. 9.

As described above, the voltage of the second reset pulse is made-smaller than the first reset pulse by α and the voltage of the selection pulse for retaining the white display in the second write period is made smaller than that of the first selection pulse by α. As a result, even the pixels having the smaller thresholds can be prevented from being switched to the black display and a good image as illustrated in the exemplary image 43 in FIG. 11 can be displayed on ferroelectric liquid crystal panel 100.

Figure 12:
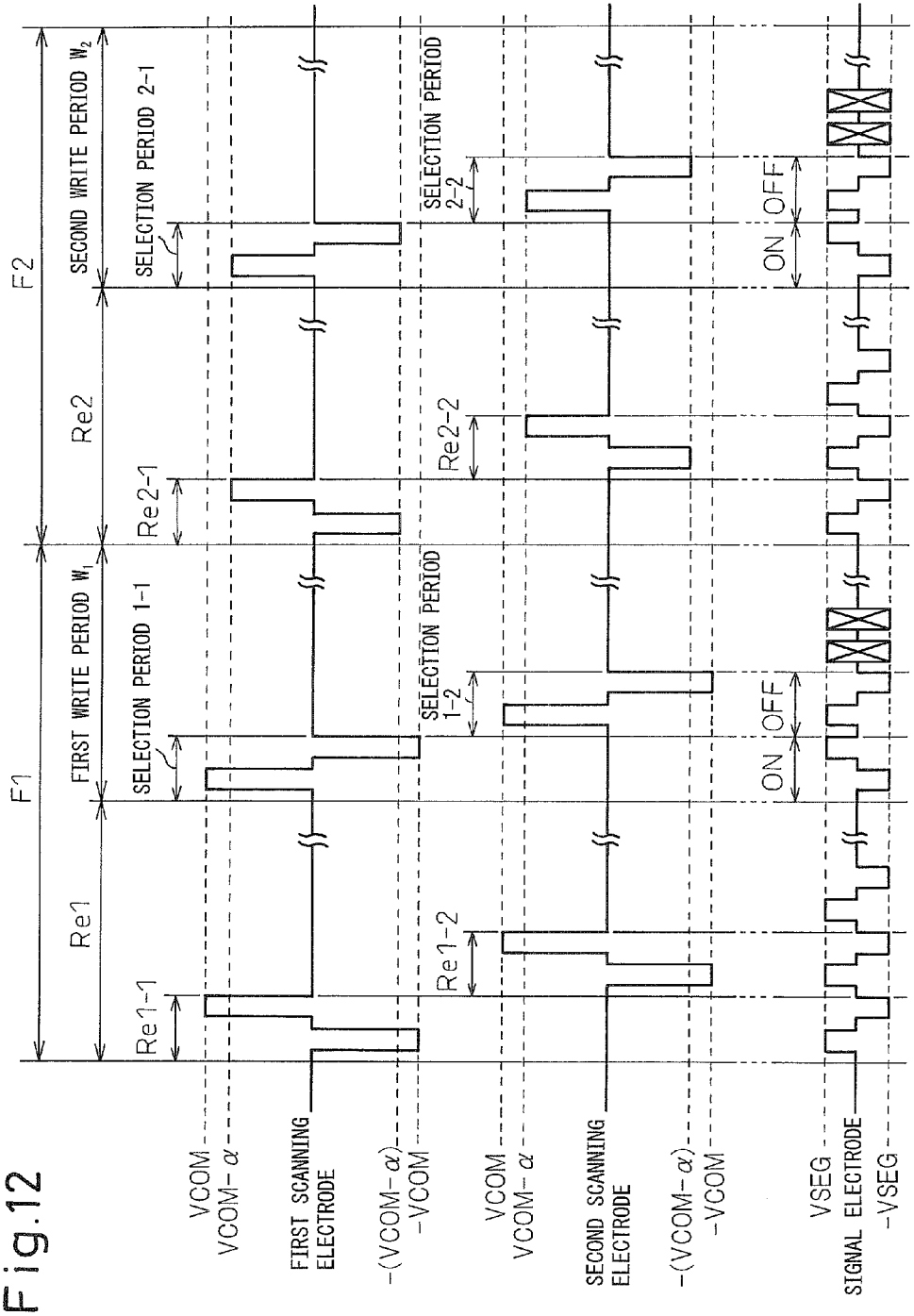
FIG. 12 is a diagram illustrating another example of scanning/signal pulses applied to scanning and signal electrodes.

FIG. 12 is a diagram illustrating another example of scanning/signal pulses applied to scanning and signal electrodes of the ferroelectric liquid crystal panel.

FIG. 12 illustrates scanning pulses applied to first and second scanning electrodes 104 and signal pulses applied to all signal electrodes 105. Drive voltage waveform control circuit 111 controls scanning drive voltage waveform generating circuit 112 to apply the scanning pulses to scanning electrodes 104 as illustrated in FIG. 12 and controls signal drive voltage waveform generating circuit 113 to apply the signal pulses to signal electrodes 105 as illustrated in FIG. 12.

The scanning/signal pulses illustrated in FIG. 12 write an image to ferroelectric liquid crystal panel 100 employing the first frame F1 and the second frame F2. The first frame F1 includes the first reset period Re1 and the first write period W1, and the second frame F2 includes the second reset period Re2 and the second write period W2.

The exemplary scanning/signal pulses illustrated in FIG. 12 differs from those illustrated in FIG. 9 only in that in the example in FIG. 12, in the first reset period Re1 and the second reset period Re2, the scanning pulses for resetting are not simultaneously applied to all scanning electrodes 104 but applied to individual scanning electrodes 104 sequentially one by one. All other operations in the example in FIG. 12 are the same as those in FIG. 9 and description thereof is omitted.

Figure 13:
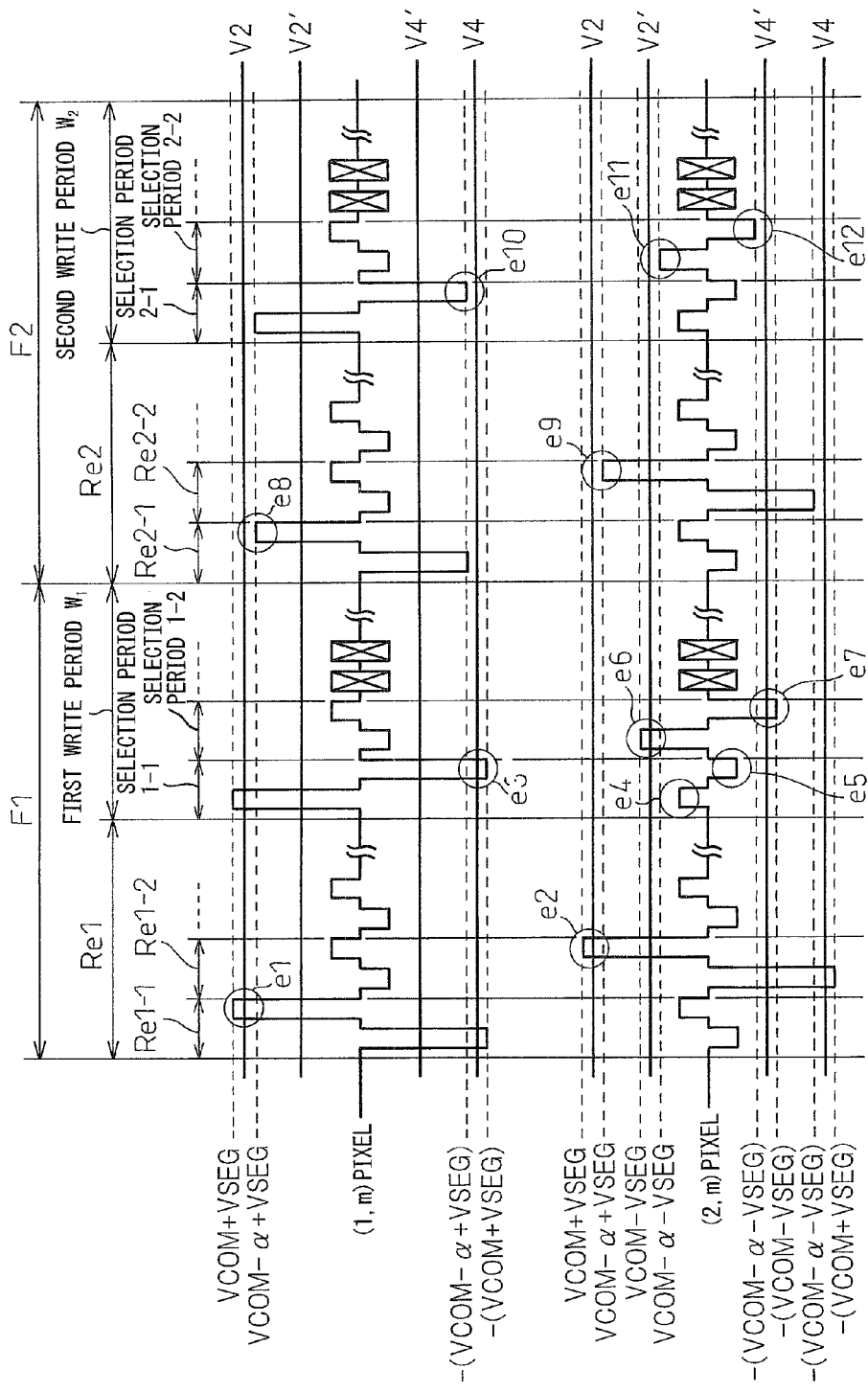
FIG. 13 is a diagram illustrating drive pulses when the scanning and signal pulses illustrated in FIG. 12 are applied.

FIG. 13 is a diagram illustrating drive pulses when the scanning and signal pulses illustrated in FIG. 12 are applied.

FIG. 13 illustrates drive pulses applied to the first pixel (1, m) and the second pixel (2, m) on the first scanning electrode. All periods illustrated in FIG. 13 are the same as those illustrated in FIG. 12.

In the first reset period Re1, reset pulses of a voltage+ (VCOM+VSEG) larger than the threshold (V2) for switching ferroelectric liquid crystal 108 to the white display are applied sequentially (see pulses e1 and e2 in FIG. 13) so that the entire screen is reset to the white display.

In the selection period 1-1, a selection pulse of a voltage− (VCOM+VSEG) having an absolute value larger than that of the threshold (V4) for switching ferroelectric liquid crystal 108 to the black display is applied to the pixel (1, m) so that the pixel (1, m) turns into the black display (see a pulse e3 in FIG. 13). On the other hand, in the selection period 1-1, pulses of ±(VSEG) are applied to nonselected pixels (for example, a pixel (2, m)) to retain the previous state (see pulses e4 and e5 in FIG. 13).

In the selection period 1-2, selection pulses of ±(VCOM− VSEG) are applied to the pixel (2, m) to retain the white display established in the first reset period Re1 (see pulses e6 and e7 in FIG. 13).

However, because of the threshold unevenness, in response to the pulse e7 in FIG. 13, the pixels having the smaller threshold (V4') may be switched from the white display to the black display.

In the second reset period Re2, reset pulses of a voltage±(VCOM−α+VSEG) smaller than the voltage±(VCOM+VSEG) applied in the first reset period Re1 are applied (see pulses e8 and e9 in FIG. 13). This voltage is smaller than the threshold (V2) for switching ferroelectric liquid crystal 108 to the white display, and therefore all of the pixels cannot be switched to the white display but only the pixels having a lower threshold (V2') are switched to the white display.

In the selection period 2-1, eventually, a selection pulse of a voltage±(VCOM−α+VSEG) smaller than ±(VCOM+VSEG) applied in the selection period 1-1 is applied (see a pulse e10 in FIG. 13).

In the selection period 2-2, selection pulses of a voltage±(VCOM−α−VSEG) are applied to the pixel (2, m) to retain the white display established in the second reset period Re2 (see pulses e11 and e12 in FIG. 13).

Also in the example illustrated in FIGS. 12 and 13, similarly to the example illustrated in FIGS. 9 and 10, the voltage of the second reset pulse is made smaller than that of the first reset pulse by α and the voltage of the selection pulse for retaining the white display in the second write period is made smaller than that of the first selection pulse by α. As a result, even the pixels having the smaller thresholds can be prevented from being switched to the black display and a good image as illustrated in the exemplary image 43 in FIG. 11 can be displayed on ferroelectric liquid crystal panel 100.

Figure 14:
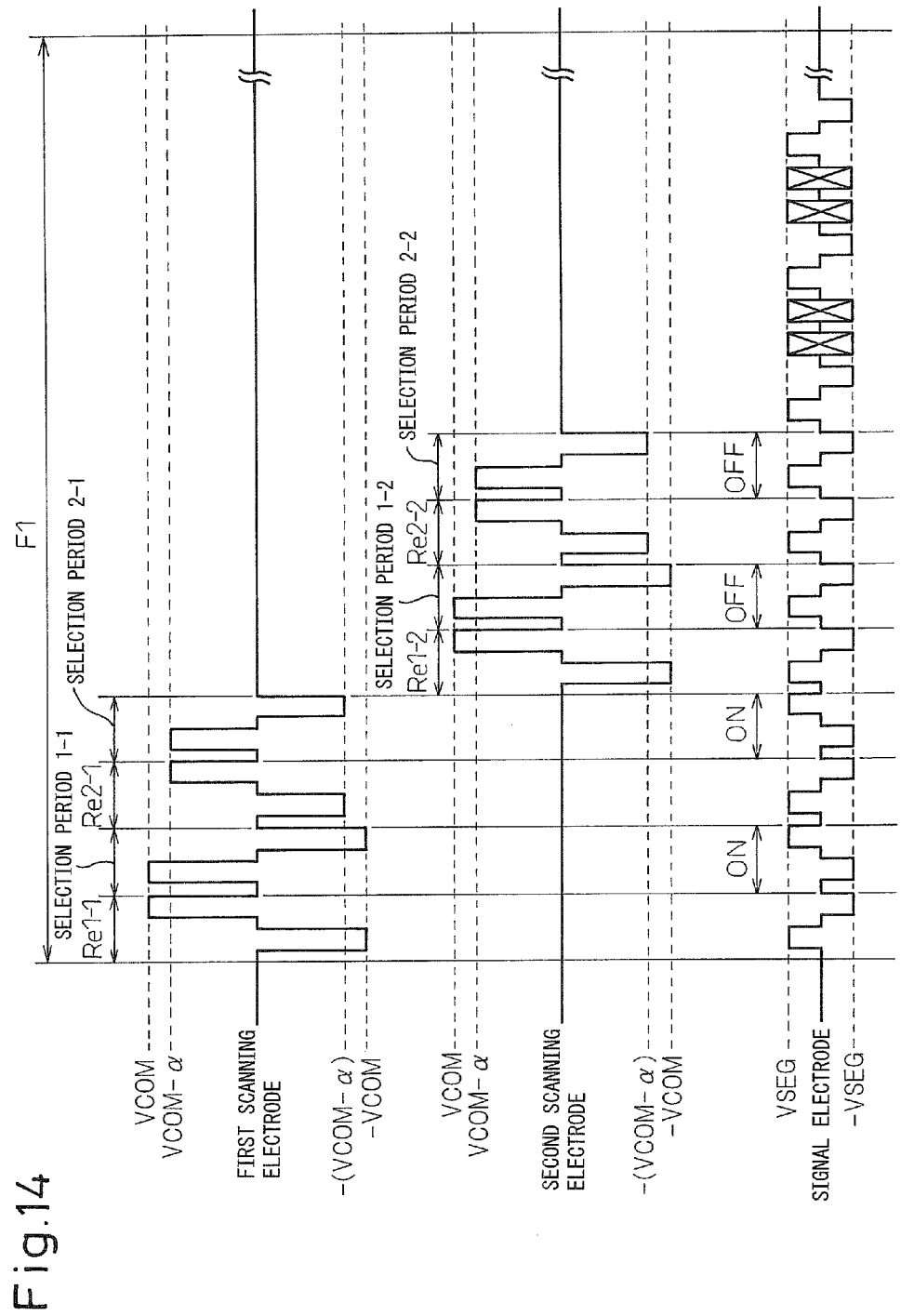
FIG. 14 is a diagram illustrating still another example of scanning/signal pulses applied to scanning and signal electrodes.

FIG. 14 is a diagram illustrating still another example of scanning/signal pulses applied to scanning and signal electrodes of the ferroelectric liquid crystal panel.

FIG. 14 illustrates scanning pulses applied to first and second scanning electrodes 104 and signal pulses applied to all signal electrodes 105. Drive voltage waveform control circuit 111 controls scanning drive voltage waveform generating circuit 112 to apply the scanning pulses to scanning electrodes 104 as illustrated in FIG. 14 and controls signal drive voltage waveform generating circuit 113 to apply the signal pulses to signal electrodes 105 as illustrated in FIG. 14.

The scanning/signal pulses illustrated in FIG. 14 write an image to ferroelectric liquid crystal panel 100 employing a first frame F1 only.

The exemplary scanning/signal pulses illustrated in FIG. 14 differs from those illustrated in FIG. 12 in that, in the example in FIG. 14, the reset pulse in the first reset period Re1, the selection pulse in the first write period W1, the reset pulse in the second reset period Re2 and the selection pulse in the second write period W2 illustrated in FIG. 12 are applied to each scanning electrode successively in one frame. Thus, the four pulses that are applied sequentially over a plurality of periods in a plurality of frames in the example in FIG. 12 are applied successively all at once in the example in FIG. 14. The order of the signal pulses applied to all the signal electrodes is changed depending on the scanning pulses applied to each scanning electrode.

Figure 15:
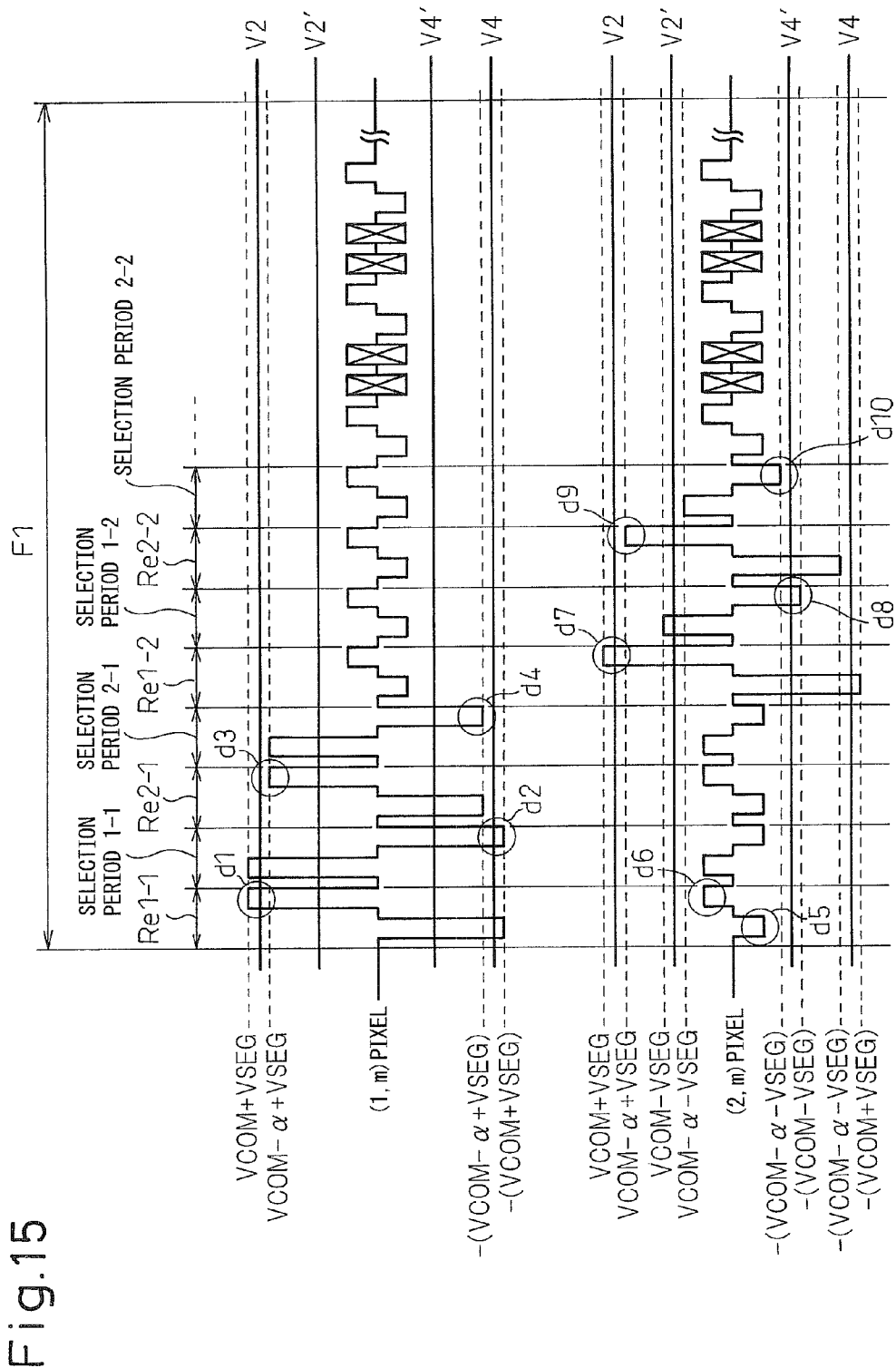
FIG. 15 is a diagram illustrating drive pulses when the scanning and signal pulses illustrated in FIG. 14 are applied.

FIG. 15 is a diagram illustrating drive pulses when the scanning and signal pulses illustrated in FIG. 14 are applied.

In order to turn the pixel (1, m) into the black display, first, the first reset pulse of a voltage±(VCOM+VSEG) larger than the threshold (V2) for switching ferroelectric liquid crystal 108 to the white display is applied (see a pulse d1 in FIG. 15) so that the pixel (1, m) is reset to the white display. Next, the first selection pulse having an absolute value larger than the threshold (V4) for switching ferroelectric liquid crystal 108 to the black display is applied (see a pulse d2 in FIG. 15) so that the pixel (1, m) turns into the black display. Next, the second reset pulse of a voltage+(VCOM−α+VSEG) smaller than the first reset pulse+(VCOM+VSEG) is applied (see a pulse d3 in FIG. 15). Finally, the second selection pulse of the voltage−(VCOM−α+VSEG) smaller than the first selection pulse−(VCOM+VSEG) is applied (see a pulse d4 in FIG. 15).

While the four drive pulses described above are applied to the pixel (1, m), a voltage±(VSEG) is applied to nonselected pixels (for example, the pixel (2, m)) to retain the previous state (see pulses d5 and d6 and the like).

In order to turn the pixel (2, m) into the white display, first, the first reset pulse of a voltage+(VCOM+VSEG) larger than the threshold (V2) for switching ferroelectric liquid crystal 108 to the white display is applied (see a pulse d7 in FIG. 15) so that the pixel (1, m) is reset to the white display. Next, in order to retain the white display, the first selection pulse having a voltage−(VCOM−VSEG) smaller than the threshold (V4) for switching ferroelectric liquid crystal 108 to the black display is applied (see a pulse d8 in FIG. 15). Next, the second reset pulse of a voltage+(VCOM−α+VSEG) smaller than the first reset pulse+(VCOM+VSEG) is applied (see a pulse d9 in FIG. 15). Finally, the second selection pulse of a voltage−(VCOM−α+VSEG) smaller than the first selection pulse−(VCOM−VSEG) is applied (see a pulse d10 in FIG. 15).

Also in the example illustrated in FIGS. 14 and 15, similarly to the example illustrated in FIGS. 9 and 10, the voltage of the second reset pulse is made smaller than that of the first reset pulse by α and the voltage of the selection pulse for retaining the white display in the second write period is made smaller than that of the first selection pulse by α. As a result, even the pixels having the smaller thresholds can be prevented from being switched to the black display and a good image as illustrated in an exemplary image 43 in FIG. 11 can be displayed on ferroelectric liquid crystal panel 100.

Figure 16:
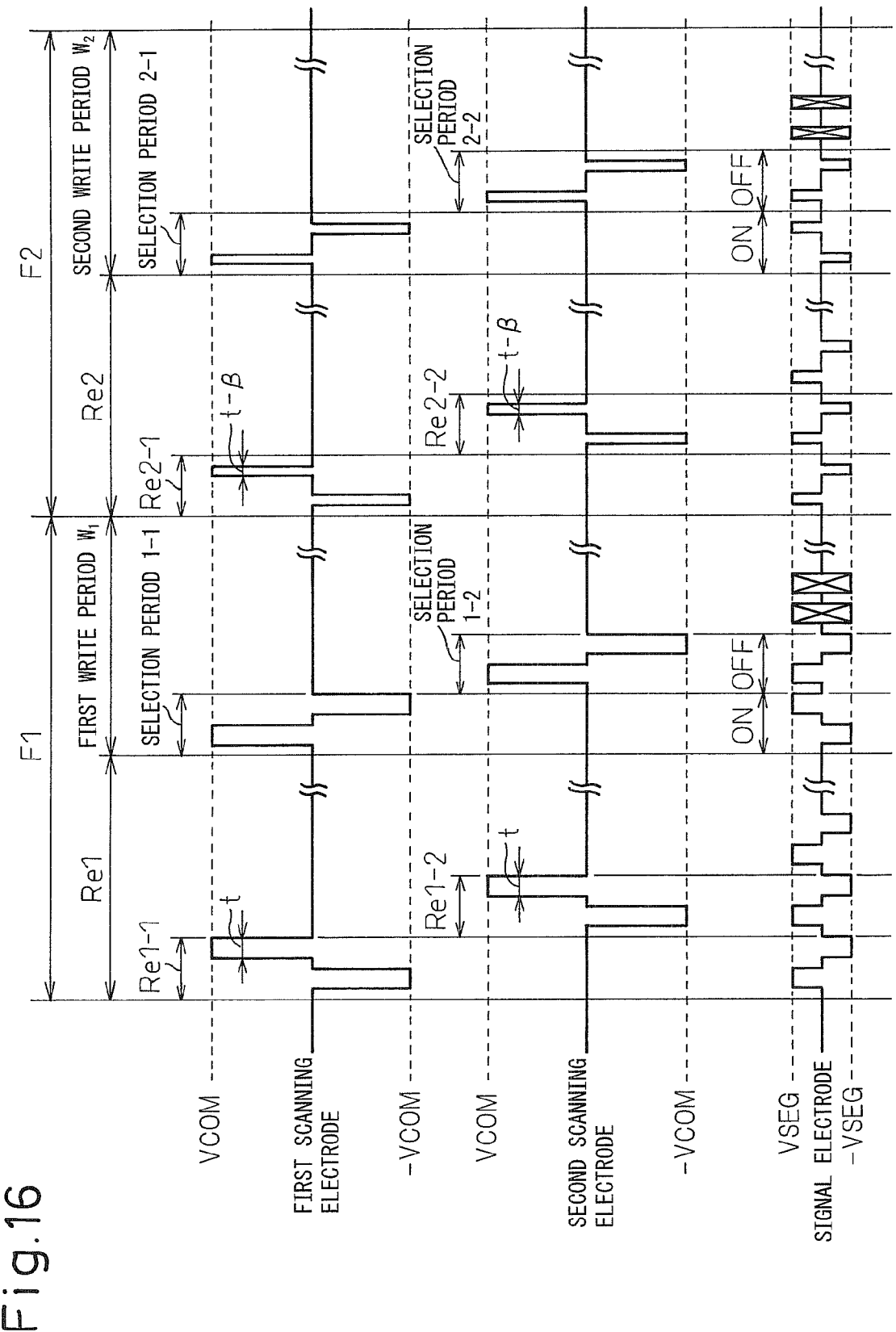
FIG. 16 is a diagram illustrating yet another example of scanning/signals pulse applied to scanning and signal electrodes.

FIG. 16 is a diagram illustrating yet another example of scanning/signals pulse applied to scanning and signal electrodes of the ferroelectric liquid crystal panel.

FIG. 16 illustrates scanning pulses applied to first and second scanning electrodes 104 and signal pulses applied to all signal electrodes 105. Drive voltage waveform control circuit 111 controls scanning drive voltage waveform generating circuit 112 to apply the scanning pulses to scanning electrodes 104 as illustrated in FIG. 16 and controls signal drive voltage waveform generating circuit 113 to apply the signal pulses to signal electrodes 105 as illustrated in FIG. 16.

The drive pulses illustrated in FIG. 16 write an image to ferroelectric liquid crystal panel 100 employing the first frame F1 and the second frame F2. The first frame F1 includes the first reset period Re1 and the first write period W1, and the second frame F2 includes the second reset period Re2 and the second write period W2.

In the example of the scanning/signal pulses illustrated in FIG. 12, the pulse width (time period) of all pulses is constant and the pulses act differently by changing the pulse height (voltage). However, ferroelectric liquid crystal 108 switches the polarity in response to the applied voltage×the applied time period (the integral value of the applied voltage). Therefore, in the example of the scanning/signal pulses illustrated in FIG. 16, the pulse height (voltage) is kept constant but the pulse width (time period) is changed so as to obtain an effect similar to that of the previous examples.

More specifically, in the first reset period Re1, a reset pulse of a voltage±VCOM is applied to all scanning electrodes for t seconds whereas, in the second reset period Re2, a reset pulse of a voltage±VCOM is applied to all scanning electrodes for (t−β) seconds. Similarly, in the first write period W1, a selection pulse of a voltage±VCOM is applied to all scanning electrodes for t seconds whereas, in the second write period W2, a selection pulse of a voltage±VCOM is applied to all scanning electrodes for (t−β) seconds.

The voltage±VCOM×(t−β) in the second reset period Re2 in the example in FIG. 16 is determined to correspond to the voltage±(VCOM−α)×unit time applied in the second reset period Re2 in the example in FIG. 12, and the voltage±VCOM×(t−β) in the second write period W2 in the example in FIG. 16 is determined to correspond to the voltage±(VCOM−α)×unit time applied in the second reset period W2 in the example in FIG. 12.

Figure 17:
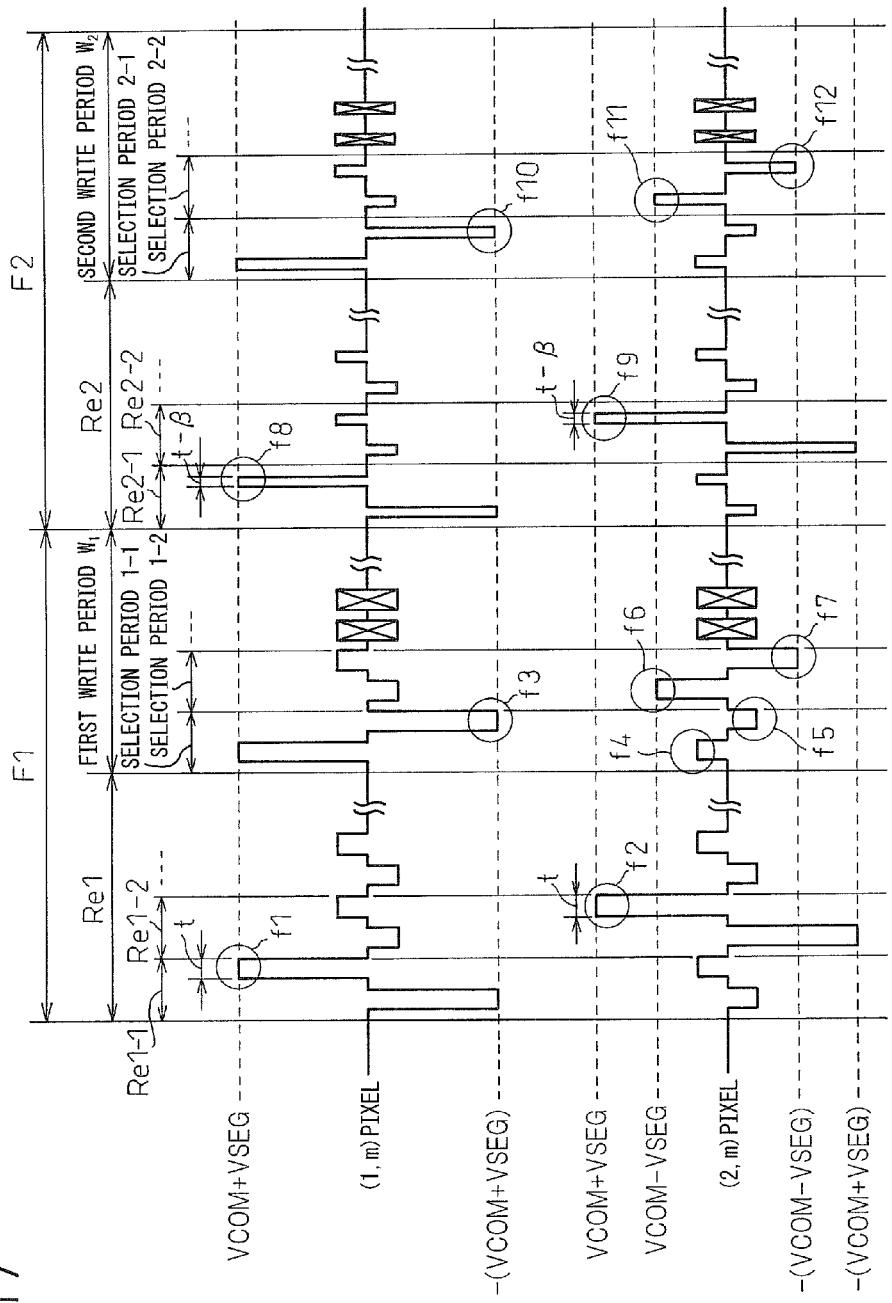
FIG. 17 is a diagram illustrating drive pulses when the scanning and signal pulses illustrated in FIG. 16 are applied.

FIG. 17 is a diagram illustrating drive pulses when the scanning and signal pulses illustrated in FIG. 16 are applied.

FIG. 17 illustrates drive voltages applied to the first pixel (1, m) and the second pixel (2, m) on the first scanning electrode. All time periods illustrated in FIG. 17 are defined to be the same as those illustrated in FIG. 16.

In the first reset period Re1, reset pulses of a voltage integral value+(VCOM+VSEG)×t larger than the threshold (V2) for switching ferroelectric liquid crystal 108 to the white display are applied sequentially (see pulses f1 and f2 in FIG. 17) so that the entire screen is reset to the white display.

In the selection period 1-1, a selection pulse of a voltage integral value−(VCOM+VSEG)×t larger than the threshold (V4) for switching ferroelectric liquid crystal 108 to the black display is applied to the pixel (1, m) so that the pixel (1, m) turns into the black display (see a pulse f3 in FIG. 17). On the other hand, in the selection period 1-1, a voltage integral value±(VSEG)×t is applied to nonselected pixels (for example, a pixel (2, m)) to retain the previous state (see pulses f4 and f5 in FIG. 17).

In the selection period 1-2, a voltage integral value±(VCOM−VSEG)×t is applied to the pixel (2, m) to retain the white display established in the first reset period Re1 (see pulses f6 and f7 in FIG. 17). However, because of the threshold unevenness, in response to the pulse f7 in FIG. 17, the pixels having the smaller threshold (V4') may be switched from the white display to the black display.

In the second reset period Re2, reset pulses of a voltage integral value+(VCOM+VSEG)×(t−β) smaller than the voltage integral value±(VCOM+VSEG)×t applied in the first reset period Re1 are applied (see pulses f8 and f9 in FIG. 17). Because this voltage is smaller than the threshold (V2) for switching ferroelectric liquid crystal 108 to the white display, all the pixels cannot be switched to the white display but only the pixels having a lower threshold (V2') are switched to the white display.

In the selection period 2-1, a selection pulse of a voltage integral value−(VCOM+VSEG)×(t−β) smaller than −(VCOM+VSEG)×t applied in the selection period 1-1 is applied (see a pulse f10 in FIG. 17).

In the selection period 2-2, selection pulses of a voltage integral value±(VCOM−VSEG)×(t−β) are applied to the pixel (2, m) to retain the white display established in the second reset period Re2 (see pulses f11 and f12 in FIG. 17).

In the example illustrated in FIGS. 16 and 17, the pulse width of the second reset pulse is made shorter than that of the first reset pulse by β and the pulse width of the selection pulse for retaining the white display in the second write period is made shorter than that of the first selection pulse by β. As a result, even the pixels having the smaller thresholds can be prevented from being switched to the black display and a good image as illustrated in the exemplary image 43 in FIG. 11 can be displayed on ferroelectric liquid crystal panel 100.

In the example in FIGS. 16 and 17, in contrast to the example in FIGS. 12 and 13 described above, the operations are modified to be controlled not by the pulse height (voltage) but by the pulse width (time period). Also in the example illustrated in FIGS. 9 and 10 and the example illustrated in FIGS. 14 and 15, the operations can be modified to be controlled not by the pulse height (voltage) but by the pulse width (time period).

In the four examples of the drive pulses described above, values of VCOM, VSEG, α and β can be determined experimentally and empirically and, for example, the values may be determined so that VCOM=4.8 v, VSEG=1.2 v and α=0.2 v. Further, in the four examples of the drive pulses described above, a single value is determined for α or β. However, a plurality of values may be prepared and controller 110 may use one of the plurality of values as α or β selectively in response to an external control signal so that ferroelectric liquid crystal panel 108 can be controlled optimally.

Figure 18:
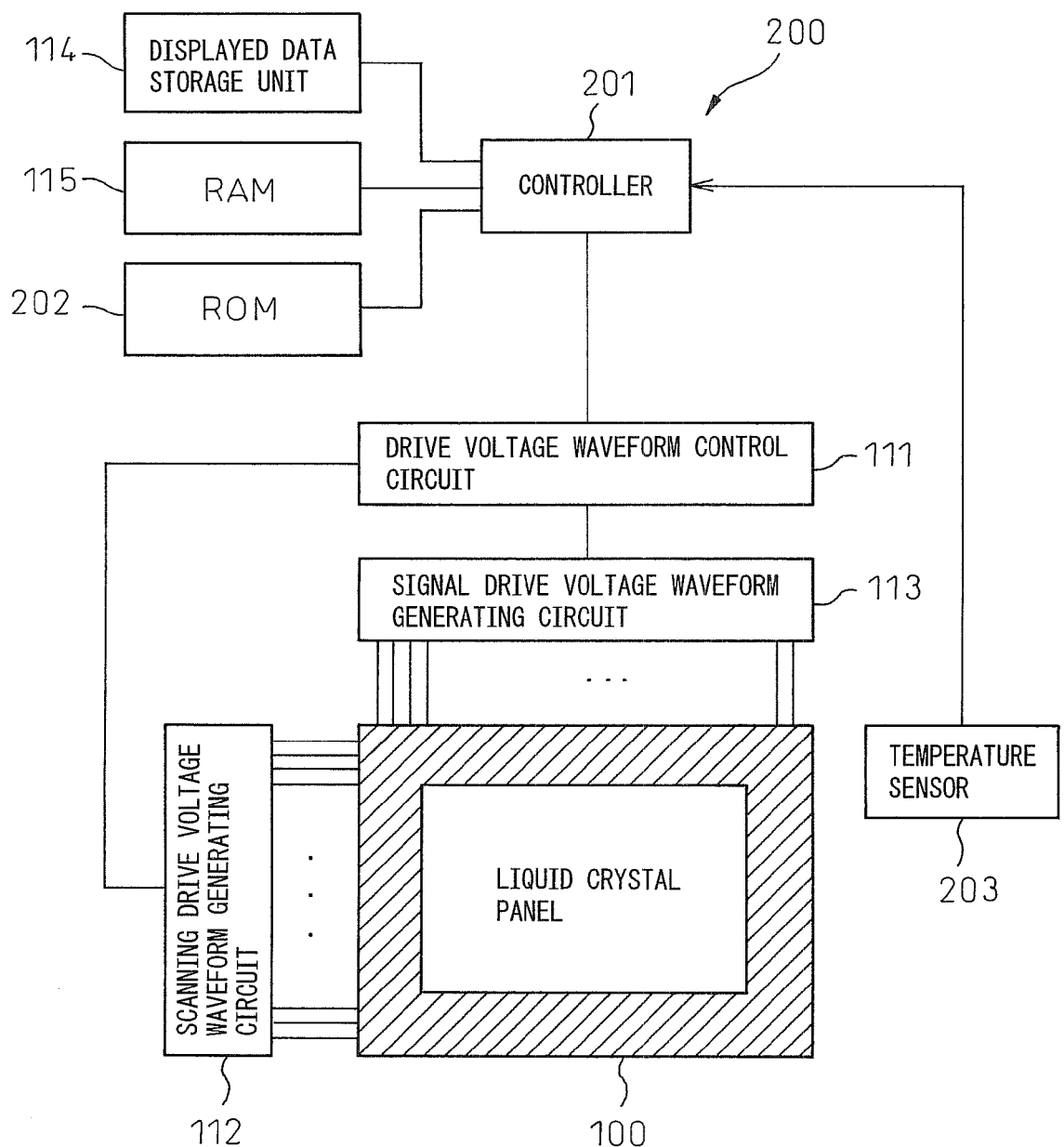
FIG. 18 is a schematic block diagram of another liquid crystal display device according to the present invention.

FIG. 18 is a schematic block diagram of another liquid crystal display device according to the present invention.

A liquid crystal display device 200 illustrated in FIG. 18 differs from liquid crystal display device 120 illustrated in FIG. 7 only in that liquid crystal device 200 has a temperature sensor 203, a ROM 202 stores a pulse width data table according to temperature, and controller 201 performs pulse width control by employing the table and based on detection outputs of temperature sensor 201. Other configurations are the same as those of liquid crystal display device 120 and their description is omitted.

Figure 19:
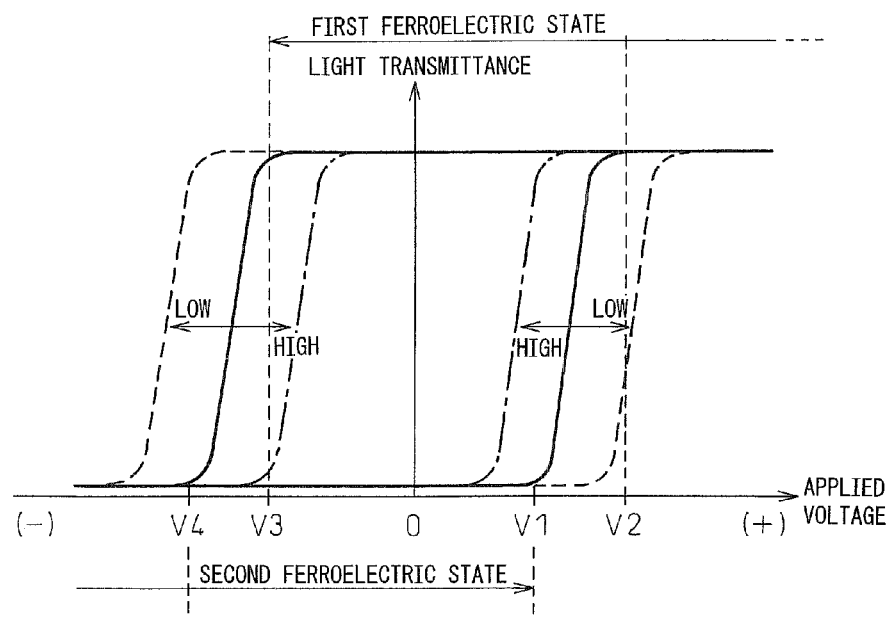
FIG. 19 is a diagram illustrating the relationship between applied voltage and light transmittance for a ferroelectric liquid crystal 108 with variation of environmental temperature.

FIG. 19 is a diagram describing variation in the thresholds due to temperature change.

As illustrated in FIG. 19, the thresholds of ferroelectric liquid crystal panel 100 vary according to environmental temperature change. More specifically, as the environmental temperature is increased, the voltage value V2 where increase of the light transmittance saturates (the positive threshold) is reduced and the voltage value V4 where reduction of the light transmittance saturates (the negative threshold) is also reduced. On the other hand, as the environmental temperature is reduced, the voltage value V2 where increase of the light transmittance saturates (the positive threshold) is increased and the voltage value V4 where decrease of the light transmittance saturates (the negative threshold) is also increased.

Therefore, in order to achieve better image display, it is preferable to change the voltage integral values applied to ferroelectric liquid crystal panel 100 according to the environmental temperature. Hereinafter, by using the example illustrated in FIGS. 16 and 17 in which the operations are controlled by the pulse height (voltage) and the pulse width (time period), the temperature control will be described.

As illustrated in FIGS. 16 and 17, in the first reset period Re1, the reset pulses±(VCOM+VSEG)×t are applied to all pixels (see f1 and f2 in FIG. 17). In the selection period 1-1, the pulse±(VCOM+VSEG)×t is applied to the selected pixels for the black display (see f3 in FIG. 17) and the pulses±(VSEG)×t are applied to the nonselected pixels (see f4 and f5 in FIG. 17). In the selection period 1-2, ±(VCOM−VSEG)×t is applied to the selected pixels for the white display. Further, in the reset period Re2, the reset pulses±(VCOM+VSEG)×(t−β) are applied to all pixels (see f8 and f9 in FIG. 17). In the selection period 2-1, ±(VCOM+VSEG)×(t−β) is applied to the selected pixels for the black display (see f10 in FIG. 17) and ±(VSEG)×(t−β) is applied to the nonselected pixels. In the selection period 2-2, ±(VCOM−VSEG)×(t−β) is applied to the selected pixels for the white display (see f11 and f12 in FIG. 17).

By changing the pulse width t according to the temperature while keeping the pulse height constant, the better image quality can be achieved regardless of the threshold variation due to the temperature. More specifically, as the temperature is increased, the pulse width t is reduced and, as the temperature is reduced, the pulse width t is increased. The relationship between the detection output of temperature sensor 203 and the pulse width t can be stored in a table and recorded in ROM 202 in advance. Controller 201 obtains the detection output from temperature sensor 203 at a predetermined timing (for example, upon energization of liquid crystal display device 200, every hour and the like) and, based on the obtained detection output, determines the pulse width t by using the table recorded in ROM 202 in advance. Controller 201 performs the operations illustrated in FIGS. 16 and 17 by using the determined pulse width t and performs the display control of ferroelectric liquid crystal panel 100 by employing drive voltage waveform control circuit 111 and the like.

The value β by which the pulse width of the second reset pulse is reduced may be constant regardless of the environmental temperature change. However, it is more preferable to change the value β according to the environmental temperature change.

It is thought that the threshold unevenness between the pixels in ferroelectric liquid crystal panel 100 occurs by assembly conditions of the panel. As the environmental temperature is increased, viscosity of ferroelectric liquid crystal 108 in ferroelectric liquid crystal panel 100 is reduced and, as a result, the positive threshold V2 is reduced and the negative threshold V4 is increased. As the viscosity is reduced, ferroelectric liquid crystal 108 becomes more sensitive to the assembly conditions of ferroelectric liquid crystal panel 100 and the threshold unevenness between the pixels in ferroelectric liquid crystal panel 100 is increased. Conversely, as the environmental temperature is reduced, the viscosity of ferroelectric liquid crystal 108 in ferroelectric liquid crystal panel 100 is increased. As the viscosity is increased, ferroelectric liquid crystal 108 becomes less sensitive to the assembly conditions of ferroelectric liquid crystal panel 100 and the threshold unevenness between the pixels in ferroelectric liquid crystal panel 100 is reduced.

Therefore, it is desirable that, when the environmental temperature is increased, the value β is increased and, when the environmental temperature is reduced, the value β is reduced. More specifically, it is desirable that the value β at 0° C. is made smaller than that at 20° C.

In the above example, when the drive pulses applied to ferroelectric liquid crystal panel 100 are controlled by the pulse width (time period) as illustrated in FIGS. 16 and 17, the pulse width is changed according to the environmental temperature. However, when the drive pulses applied to ferroelectric liquid crystal panel 100 are controlled only by the pulse height (voltage) as illustrated in FIGS. 9 and 10 (the pulse width is constant), only the pulse height (voltage) may be changed according to the environmental temperature. Further, the drive pulses applied to ferroelectric liquid crystal panel 100 may be controlled by the pulse width (time period) and the pulse height (voltage) and the pulse width (time period) and the pulse height (voltage) may be changed according to the environmental temperature.

Figure 20:
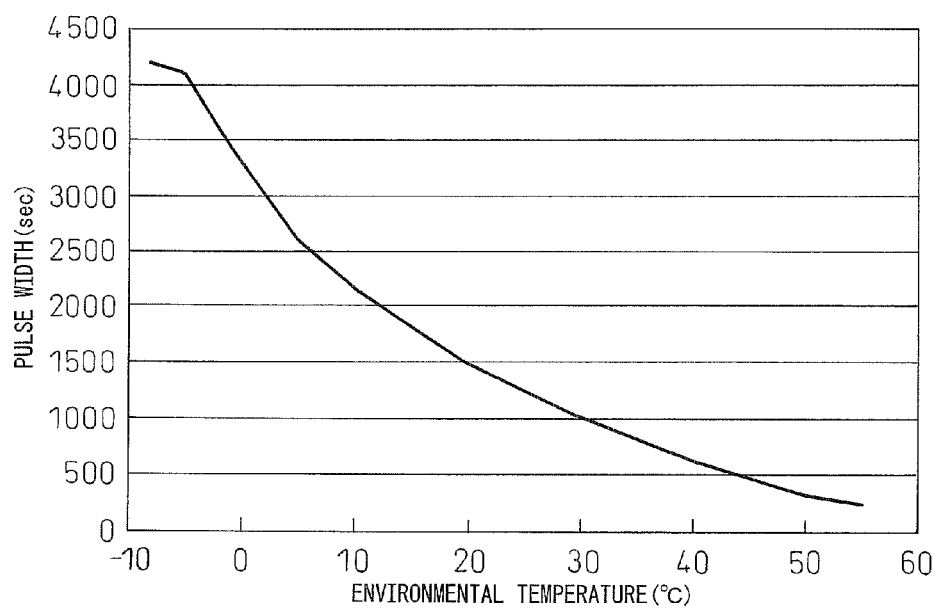
FIG. 20 is a diagram illustrating the relationship between pulse width and environmental temperature.

FIG. 20 is a diagram illustrating the relationship between the pulse width and the environmental temperature.

In order to demonstrate the relationship between the pulse width r (sec) of the drive pulses applied to the pixels in ferroelectric liquid crystal panel 100 and the environmental temperature T (° C.), FIG. 20 illustrates a graph of the values of the pulse width plotted every 5° C. in the range from −8° C. to 55° C.

The pulse width r in the figure is the pulse width when the drive pulses applied to ferroelectric liquid crystal panel 100 is controlled only by the pulse width (the voltage value is constant at VSEL (v)) and corresponds to the reset pulses applied to all pixels in the first reset period Re1 in FIG. 17. Therefore, the pulse width r is determined so that (VCOM+VSEG)× t=VSEL×r. For example, at 25° C., it may be determined that VCOM=4.8 v, VSEG=1.2 v, t=1500 μsec and β=50 μsec.

As illustrated in FIG. 20, the pulse width r is reduced as the environmental temperature is increased and increased as the environmental temperature is reduced.

As described above, by changing the drive pulses applied to ferroelectric liquid crystal panel 100 is changed according to the change of environmental temperature, a better image can be displayed.

In the examples of the derive pulses described above, because the white display should be retained in the background and the pixels switched to the black display due to the lower threshold (V4') cause the problem (see the exemplary image 41 in FIG. 11), the lower selection pulses(±(VCOM− α−VSEG) or ±(VCOM−VSEG)×(t−β) are applied. Conversely, when the black display should be retained in the background, the pixels switched to the white display due to the lower threshold (V2') cause the problem. However, the present invention can also be applied to such case.

What is claimed is:

1. A liquid crystal display device comprising:
a ferroelectric liquid crystal panel having a ferroelectric liquid crystal provided between a pair of substrates, a plurality of scanning electrodes and a plurality of drive electrodes for driving said ferroelectric liquid crystal, and a plurality of pixels constituted by intersections between said plurality of scanning electrodes and said plurality of signal electrodes; and
a controller for applying driving pulses to said plurality of scanning electrodes and said plurality of signal electrodes so as to display an image on the basis of display data,
wherein some of said plurality of pixels have first thresholds for switching between the white display and the black display of the ferroelectric liquid crystal and a rest of said plurality of pixels has second thresholds for switching between the white display and the black display of the ferroelectric liquid crystal, which are higher than the first thresholds,
wherein said controller applies to said plurality of pixels first reset pulses, said controller applies to said plurality of pixels first selection pulses for switching said plurality of pixels after the application of said first reset pulses so that said image on the basis of said display data, including unintended pixels and intended pixels, is formed, said controller applies to said plurality of pixels second reset pulses having a voltage or pulse width different from that of said first reset pulses after the application of said first selection pulses, and said controller applies to said plurality of pixels second selection pulses having a voltage or pulse width different from that of said first selection pulses and for switching said plurality of pixels after the application of said second reset pulses, such that said some of said plurality of pixels having the first thresholds are not switched to black display whereby said unintended pixels are removed from said image by said second reset pulses and said second selection pulses,
wherein said second reset pulses have a voltage smaller than that of said first reset pulses or a pulse width smaller than that of said first reset pulses, and
wherein said second selection pulses have a voltage smaller than that of said first selection pulses or a pulse width smaller than that of said first selection pulses, and wherein said image based on said display data is formed on said ferroelectric liquid crystal panel by employing a first frame and a second frame which follows the first frame, said first reset pulses and said first selection pulses are applied in said first frame, and said second reset pulses and said second selection pulses are applied in said second frame, and wherein said driving pulses applied on said first frame and second frame are generated based on the same display data.

2. The liquid crystal display device according to claim 1, wherein said ferroelectric liquid crystal panel has a plurality of scanning electrodes and a plurality of signal electrodes, and said first reset pulses and said second reset pulses are applied to all of said plurality of scanning electrodes.

3. The liquid crystal display device according to claim 1, wherein said ferroelectric liquid crystal panel has a plurality of scanning electrodes and a plurality of signal electrodes, and said first reset pulses and said second reset pulses are applied sequentially to each of the plurality of scanning electrodes.

4. The liquid crystal display device according to claim 1, wherein said ferroelectric liquid crystal panel has a plurality of pixels constituted by intersections between a plurality of scanning electrodes and a plurality of signal electrodes, and said first reset pulses, said first selection pulses, said second reset pulses and said second selection pulses are applied sequentially to said plurality of scanning electrodes.

5. The liquid crystal display device according to claim 1, further comprising a temperature sensor, wherein said controller changes voltages or pulse widths of said first and second reset pulses and said first and second selection pulses based on detection output of said temperature sensor.

6. A method for driving a ferroelectric liquid crystal panel having a ferroelectric liquid crystal disposed between a pair of substrates, electrodes for driving said ferroelectric liquid crystal, and a plurality of pixels constituted by said electrodes, wherein some of said plurality of pixels have first thresholds for switching between the white display and the black display of the ferroelectric liquid crystal and a rest of said plurality of pixels has second thresholds for switching between the white display and the black display of the ferroelectric liquid crystal, which are higher than the first thresholds, comprising the steps of:

applying first reset pulses to said ferroelectric liquid crystal through said electrodes;

applying first selection pulses for switching said plurality of pixels of said ferroelectric liquid crystal through said electrodes after the application of said first reset pulses so that said image on the basis of said image data, including unintended pixels and intended pixels, is formed;

applying second reset pulses having a voltage whose absolute value is smaller than that of said first reset pulses or pulse width smaller than that of said first reset pulses to said ferroelectric liquid crystal through said electrodes after the application of said first selection pulses; and applying second selection pulses having a voltage whose absolute value is smaller than that of said first selection pulses or pulse width smaller than that of said first selection pulses to said ferroelectric liquid crystal through said electrodes after the application of said second reset pulses, such that said some of said plurality of pixels having the first thresholds are not switched to black display, whereby said unintended pixels are removed from said image by said second reset pulses and said second selection pulses, wherein an image, based on display data is formed on said ferroelectric liquid crystal panel by employing a first frame and a second frame which follows the first frame, said first reset pulses and said first selection pulses are applied in said first frame, and said second reset pulses and said second selection pulses are applied in said second frame, and wherein said driving pulses applied on said first frame and second frame are generated based on the same display data.

7. A liquid crystal display device comprising:

a ferroelectric liquid crystal panel having a ferroelectric liquid crystal provided between a pair of substrates, a plurality of scanning electrodes and a plurality of drive electrodes for driving said ferroelectric liquid crystal, and a plurality of pixels constituted by intersections between said plurality of scanning electrodes and said plurality of signal electrodes; and a controller for applying driving pulses to said plurality of scanning electrodes and said plurality of signal electrodes, in order to form an image on the basis of display data, wherein the image is formed by employing a first frame and a second frame, wherein some of said plurality of pixels have first thresholds for switching between the white display and the black display of the ferroelectric liquid crystal and a rest of said plurality of pixels has second thresholds for switching between the white display and the black display of the ferroelectric liquid display, which are higher than the first thresholds, wherein said controller applies to said plurality of pixels first reset pulses and first selection pulses for switching said plurality of pixels, in said first frame so that said image on the basis of said image data, including unintended pixels and intended pixels, is formed, and wherein, in said second frame which follows the first frame, said controller applies to said plurality of pixels second reset pulses having a voltage whose absolute value is smaller than that of said first reset pulses or a pulse width smaller than that of said first reset pulses, and second selection pulses having a voltage whose absolute value is smaller than that of said first selection pulses or a pulse width smaller than that of said first selection pulses such that said some of said plurality of pixels having the first thresholds are not switched to black display whereby said unintended pixels are removed from said image by said second reset pulses and said second selection pulses, and wherein said driving pulses applied on said first frame and second frame are generated based on the same display data.

* * * * *